(12) United States Patent
Prüssmeier et al.

(10) Patent No.: US 10,128,733 B2
(45) Date of Patent: Nov. 13, 2018

(54) POSITION-DETECTION SYSTEM

(71) Applicant: Beckhoff Automation GmbH, Verl (DE)

(72) Inventors: Uwe Prüssmeier, Lemgo (DE); Uwe Borchardt, Vlotho (DE)

(73) Assignee: Beckhoff Automation GmbH, Verl (DE)

( * ) Notice: Subject to any disclaimer, the term of this patent is extended or adjusted under 35 U.S.C. 154(b) by 418 days.

(21) Appl. No.: 14/949,060

(22) Filed: Nov. 23, 2015

(65) Prior Publication Data

US 2016/0146891 A1 May 26, 2016

(30) Foreign Application Priority Data

Nov. 24, 2014 (DE) .................. 10 2014 117 220

(51) Int. Cl.
*H02K 41/02* (2006.01)
*G01D 5/20* (2006.01)
*H02K 11/215* (2016.01)
*H02K 41/03* (2006.01)

(52) U.S. Cl.
CPC ........... *H02K 41/02* (2013.01); *H02K 11/215* (2016.01); *H02K 41/031* (2013.01); *G01D 5/2073* (2013.01)

(58) Field of Classification Search
CPC .... H02K 11/215; H02K 41/02; G01D 5/2066; G01D 5/2073
USPC ............. 324/207.11, 207.12, 207.24, 207.25
See application file for complete search history.

(56) References Cited

U.S. PATENT DOCUMENTS 6,661,127 B2 * 12/2003 Frissen ................ H02K 41/031
310/12.05
6,847,134 B2 * 1/2005 Frissen ................ H02K 41/031
310/12.05
8,207,749 B2 * 6/2012 Reime ...................... G01D 5/20
324/207.15
9,689,712 B2 * 6/2017 Prussmeier .......... H02K 41/031
(Continued)

FOREIGN PATENT DOCUMENTS

DE 10026019 A1 11/2001
DE 69502283 T3 11/2004
(Continued)

*Primary Examiner* — Jeremy Luks
(74) *Attorney, Agent, or Firm* — Dorsey & Whitney LLP

(57) ABSTRACT

A position-detection system for a drive having a rotor, which can move along a path, comprises an encoder unit, a signal-detection unit and a signal-processing device. The encoder unit or the signal-detection unit is arranged on the rotor, and the respective other unit is arranged along the path. Furthermore, the signal-processing device is designed to generate a first position signal and a second position signal on the basis of a relative position of the encoder unit and signal-detection unit. The signal-processing device is designed to determine a longitudinal position of the rotor along the path on the basis of phase values of the first and second position signals. Furthermore, the signal-processing device is designed to determine a distance, directed transversely with respect to the path, between the encoder unit and the signal-detection unit, on the basis of amplitude values of the first and second position signals, and to detect an operating state of the drive on the basis of the distance.

14 Claims, 8 Drawing Sheets

(56) References Cited

U.S. PATENT DOCUMENTS

| | | | |
|---|---|---|---|
| 9,997,985 B2 * | 6/2018 | Prussmeier | ............ B65G 54/02 |
| 2004/0169505 A1 | 9/2004 | Alun et al. | |
| 2008/0181989 A1 | 7/2008 | Thomas et al. | |
| 2010/0181989 A1 | 7/2010 | Reime | |

FOREIGN PATENT DOCUMENTS

| | | |
|---|---|---|
| DE | 102009009061 A1 | 7/2010 |
| DE | 102011003682 A1 | 8/2012 |
| DE | 102011004348 A1 | 8/2012 |
| DE | 102012204917 A1 | 10/2013 |
| EP | 1164358 B1 | 8/2005 |
| EP | 1828722 B1 | 11/2011 |

* cited by examiner

POSITION-DETECTION SYSTEM

CROSS-REFERENCE TO RELATED APPLICATION

This application claims priority to German Patent Application DE102014117200.0, filed Nov. 24, 2014, entitled POSITIONSERFASSUNGSSYSTEM, which is incorporated by reference herein, in the entirety and for all purposes.

FIELD

The present invention relates to a position-detection system for a drive, to a drive and to a method for detecting an operating state of the drive.

BACKGROUND

Drives having rotors which can move along a path are used, inter alia, in automation technology. As a rule, the rotors are guided along the path by a guide system. Such a guide system can comprise, for example, guide rails which are arranged along the path and rollers which are mounted on the carriage and roll on the guide rails. Such drives are often embodied as linear motors and comprise drive magnets which are arranged on the rotors and which interact with drive coils which are arranged along the path. The rotors of the drive can then be moved or driven by applying a current to the drive coils, with the result that the drive coils generate a suitable magnetic field which propagates along the path.

Such drives comprise as a rule a position-detection system which detects the longitudinal position of the rotors along the path and transmits it to a controller of the drive. Such a position-detection system permits, inter alia, open-loop or closed-loop control of the movement of the rotors according to a predefined control program. Inter alia, magnetic, optical or inductive position-detection systems can be used as the position-detection systems. An inductive position-detection system is disclosed, for example, in German laid-open patent application DE102012204917A1.

The use of linear motors in automation technology permits, inter alia, production goods in a fabrication system to be transported flexibly and independently of one another. A linear motor, which makes independent movement of individual rotors possible, permits, for example, production goods which are transported by the rotors to be grouped during transportation, in order to be able to combine them in common packaging.

The operating state of such a drive is as a rule monitored continuously in order to be able to detect faults of the drive or failures in the production system. Within the scope of the monitoring of the operating state, it is possible, inter alia, to detect loading of a rotor with a payload, a weight of a transported payload or wear of the drive, for example of the guide system which guides the rotors. For this purpose, as a rule sensors are used which are arranged along the path or on the rotors and transmit data to a controller which monitors the fabrication process. The sensors may be, inter alia, photoelectric barriers, Hall sensors or contact sensors, for example stop sensors. Such a system is previously known, for example, from DE102011003682A1.

A disadvantage of the use of such sensors is, inter alia, that they have to be arranged along the path in addition to the drive components, which results in increased costs and greater expenditure on installation. For example, the sensors for monitoring the operating state therefore have to be connected separately by cable to the controller. In particular, in the case of an arrangement of the sensors on the rotor, the problem of a transmission of data to the positionally fixed controller arises, which arrangement requires either the rotors to be connected by cable or active cableless data transmission devices on the rotors to be carried along. A further disadvantage is often also that the drive has to be stopped and the production interrupted in order to determine the operating state, for example to determine wear on the guide system by regular inspection.

SUMMARY

The object of the invention is to make available a system which makes it possible to monitor the operating state of a drive and which overcomes the specified disadvantages. A further object of the invention is to make available a drive whose operating state can be monitored while avoiding the specified disadvantages. An object of the invention is also to disclose a method which makes it possible to monitor the operating state of a drive and which overcomes the specified disadvantages.

These objects are achieved by means of a position-detection system, by means of a drive and by means of a method. Respective different developments are disclosed in the dependent claims.

EXAMPLES

A position-detection system for a drive having a rotor, which can move along a path, comprises an encoder unit, a signal-detection unit and a signal-processing device. The encoder unit or the signal-detection unit is arranged on the rotor, and the respective other unit is arranged along the path. Furthermore, the signal-processing device is designed to generate a first position signal and a second position signal on the basis of a relative position of the encoder unit and the signal-detection unit. The signal-processing device is designed to determine a longitudinal position of the rotor along the path on the basis of phase values of the first and second position signals. Furthermore, the signal-processing device is designed to determine a distance, directed transversely with respect to the path, between the encoder unit and the signal-detection unit, on the basis of amplitude values of the first and second position signals, and to detect an operating state of the drive on the basis of the distance.

Since the operating state is detected on the basis of the position signals of the position-detection system, particularly simple and cost-effective monitoring of the operating state of the drive can be advantageously implemented. In particular, it is possible to dispense with separate sensor devices for monitoring the operating state and with separate data transmission devices for transmitting the operating state to the signal-processing device, to a control device or to a monitoring device. Furthermore, the operating state can advantageously be detected during operation of the drive, in particular during movement of the rotor along the path. If the position-detection system is a contactless system, for example an inductive or magnetic system, the operating state can advantageously also be monitored in a contactless fashion.

The operating state of the drive which is detected by the position-detection system on the basis of the distance between the encoder unit and the signal-detection unit can comprise, for example, loading of the rotor with a payload, a weight of the payload or exceeding or undershooting of a permissible weight limit of the payload. Furthermore, the operating state can include wear of a guide system which is designed to guide the rotor along the path. In the case of a guide system which comprises rollers which run on a running surface it is possible, in particular, to detect damage to the rollers, to the running surfaces or to a bearing of the rollers.

Since the position-detection system is designed to determine the longitudinal position of the rotor along the path on the basis of phase values and the distance between the encoder unit and the signal-detection unit transversely with respect to the path on the basis of amplitude values of the first and second position signals, the longitudinal position and the distance, or the operating state, can advantageously be determined independently of one another. This is the case, in particular, when the position-detection system is configured in such a way that the distance transversely with respect to the path does not influence the phase values of the first and second position signals, and the longitudinal position does not influence the amplitude values of the first and second position signals.

Independent determination of the longitudinal position and distance is advantageously easily possible in particular when the position-detection system is configured in such a way that in the event of displacement of the encoder unit with respect to the signal-detection unit along the path the values of the first and second position signals each carry out harmonic oscillation with constant amplitude values and a defined relative phase offset. In this context, a change in phase of the first and second position signals is preferably proportional to a change in the longitudinal position of the rotor along the path. Furthermore, a change in the distance between the encoder unit and the signal-detection unit transversely with respect to the path preferably influences the amplitude values of the first and second position signals but not their phase values. The phase values of the first and second position signals can then be determined in an advantageously easy fashion on the basis of the ratio between the first and second position signals, while the amplitude values can be determined on the basis of the square sum of the first and second position signals.

In one embodiment of the position-detection system, the position-detection system is embodied as an inductive position-detection system, and the signal-detection unit comprises an exciter coil, a sine receiver coil and a cosine receiver coil. In this context, the sine receiver coil and the cosine receiver coil form a sinusoidal surface border and are arranged with a spatial phase offset. The signal-processing device is designed to generate the first position signal on the basis of signals of the sine receiver coil and to generate the second position signal on the basis of signals of the cosine receiver coil. Furthermore, the signal-processing device is designed to determine the longitudinal position on the basis of a ratio between the first position signal and the second position signal and to determine the distance on the basis of a square sum of the first and second position signals.

An inductive position-detection system with a sine receiver coil and cosine receiver coil permits, in an advantageously easy fashion, the generation of position signals whose values carry out harmonic oscillations in the event of displacement of the rotor. In such a system, the first and second position signals can be generated in an advantageously easy fashion by virtue of the fact that the encoder unit interacts with a magnetic exciter field which is generated by the exciter coils. For example, the encoder unit can be designed to damp the exciter field and as a result change a voltage, in particular a differential voltage, induced in the receiver coils by the exciter field. Alternatively, the encoder unit can also comprise an electromagnetic resonant circuit which is excited by the exciter field and itself generates a magnetic field which induces the signals in the sine receiver coil and cosine receiver coil. Furthermore, one embodiment of the position-detection system as an inductive position-detection system advantageously permits active electronic components in the encoder unit to be dispensed with. In particular, this permits a purely passive embodiment of the rotor when the encoder unit is arranged on the rotor. The use of an inductive position-detection system for determining the operating state of the drive therefore easily permits the operating state to be detected and monitored in a contactless fashion, without the installation of additional monitoring sensors.

In one embodiment of the position-detection system, the signal-processing device is designed to determine a frequency and/or an amplitude of a variation of the distance in order to detect the operating state and to detect, in particular, a disruption in a movement of the rotor on the basis thereof.

In one embodiment of the position-detection system, the signal-processing device is designed to detect a defect in a guide system, guiding the rotor along the path, of the drive.

Determining the frequency and/or amplitude of the variation of the distance advantageously easily permits conclusions to be drawn about the cause of the disruption of the movement and therefore the operating state of the drive. For example, distance variations which are repeated after, in each case, one revolution of rollers of a roller arrangement of the guide system indicate a defect in at least one of the rollers or in a roller bearing. Distance variations which repeat in each case after one circulation of the rotor about an enclosed path indicate, on the other hand, a local defect of positionally fixed parts of the guide system, for example of a guide rail. In this way, it is advantageously easily possible to detect and analyze defects in the drive, in particular wear phenomena.

In one embodiment of the position-detection system, for the purpose of detecting the operating state, the signal-processing device is designed to correlate the distance with the longitudinal position of the rotor along the path and/or with a speed of the rotor and/or with energy absorption of a drive element, which drives the rotor, of the drive. This advantageously permits conclusions to be drawn about the causes of variation in distance and therefore about the operating state of the drive. In particular, when the measured distance values correlate with the longitudinal position of the rotor along the path it can be determined whether a variation of the distance occurs in a positionally fixed fashion at a specific point on a guide system which guides the rotor. This indicates a defect in the guide system at this specific point. A change in the distance, which change correlates with an increased energy absorption of the drive element can indicate, for example, a coating, for example soiling, on a running surface of the guide system. Since both the distance and the longitudinal position are determined from the first and second position signals, the distance and the longitudinal position can be correlated with one another particularly easily. In particular, adjustment of the timing between signals of separate sensor systems or detection systems, for example by means of time stamps in corresponding signal data items, can be dispensed with.

In one embodiment of the position-detection system, the signal-detection unit is arranged in a positionally fixed fashion along the path, and the encoder unit is arranged on the rotor. This advantageously permits a particularly simple and cost-effective embodiment of the position-detection system or of a drive with improved monitoring of the operating state. In particular, it is possible to embody an encoder unit which is arranged on the rotor in a passive way, and therefore also to embody the rotor itself in a passive way, that is to say without active electrical or electronic components. Furthermore, it is advantageously possible to dispense with electrical contact-forming means of the rotor or with the need to carry along an energy supply on the rotor.

In one embodiment of the position-detection system, the encoder unit and signal-detection unit are embodied in such a way that an external force action acts on the encoder unit, or the signal-detection unit brings about a change in the distance between the encoder unit and the signal-detection unit. Furthermore, the signal-processing device is designed to detect the external force action within the scope of the detection of the operating state. As a result, advantageously simple and reliable detection of the external force action and therefore of the operating state of the drive by means of the position-detection system is made possible. The external force action can be caused, for example, by loading of the rotor with a payload, and contact of the rotor with other elements of the drive or of a system which comprises the drive.

In one embodiment of the position-detection system, the encoder unit and the signal-detection unit are arranged in such a way that a weight of a payload which is conveyed by the rotor causes the external force action. With such an embodiment, the operating state of the drive which is to be determined can advantageously comprise the presence of the payload on the rotor, a weight of the payload or exceeding or undershooting of a defined weight limit by the payload, and said operating state can easily be detected by evaluating the distance between the encoder unit and the signal-detection unit. Detection of the weight by means of the position-detection system permits an advantageously simple design of the drive while dispensing with a specific sensor system for detecting the weight. Furthermore, the weight can be detected during the movement of the rotor, and a loss of the payload during transportation can easily be detected.

In one embodiment of the position-detection system, the encoder unit and the signal-detection unit are arranged in such a way that the external force action is applied by a mechanical unit to the encoder unit or the signal-detection unit. The mechanical unit is designed here to generate a transverse force, directed transversely with respect to the path, on the basis of the weight of the payload.

The use of a mechanical unit for applying the external force action on the encoder unit or the signal-detection unit advantageously also permits the weight of a payload to be detected even when, in order to vary the distance between the encoder unit and the signal-detection unit, a force component transversely with respect to the path is necessary but the drive is configured in such a way that the weight of the payload does not have a sufficient lateral force component. Moreover, the force action which results from the weight of the payload can advantageously be adapted by means of a transmission ratio of the mechanical unit. In addition, the mechanical unit makes it possible to shift the measuring range in order to determine the weight by mounting a suitable counter element, for example a spring or an opposing weight, and therefore to adapt said measuring range in an optimum way to the conveyed payload and to the operating state to be determined.

In one embodiment of the position-detection system, the encoder unit or the signal-detection unit is mounted on the rotor and is designed in such a way that the external force action essentially brings about elastic bending of an elastic part of the encoder unit or of the signal-detection unit transversely with respect to the path. Such an embodiment of the encoder unit or of the signal-detection unit advantageously easily permits a position-detection system to be implemented in which an external force action on the encoder unit or the signal-detection unit brings about a change in the distance between the two units, and which permits simple determination of the operating state of the drive, in particular during a movement of the rotor.

In one embodiment of the position-detection system, the encoder unit or the signal-detection unit is arranged on the rotor and is designed in such a way that the external force action brings about essentially an offset, directed transversely with respect to the path, of the encoder unit or of the signal-detection unit in relation to the respective other unit. As a result, it can advantageously be ensured that an angle between the encoder unit and the signal-detection unit remains constant during variation of the distance between the encoder unit and the signal-detection unit, in particular that the encoder unit and the signal-detection unit remain oriented in parallel with one another even when the distance varies. A constant relative orientation, in particular a constant parallel orientation, of the encoder unit and signal-detection unit advantageously permits particularly precise determination of the external force action on the basis of the variation of the distance. This facilitates the detection of different operating states, which can comprise, for example, loading of the rotor with payloads of different weights.

A drive has a position-detection system, a rotor which can move along a path and a guide system which guides the rotor along the path, and is embodied as a linear motor. Furthermore, the drive comprises a drive device which is arranged along the path, wherein the drive device itself comprises a multiplicity of drive coils which are arranged along the path. Furthermore, the rotor has a drive magnet, and the drive coils are designed to generate a magnetic field which interacts with the drive magnet of the rotor in order to generate a driving force.

The use of a position-detection in a drive which is embodied as a linear motor makes it advantageously possible to monitor the operating state of the drive easily. In particular, no additional components such as sensors or data transmission devices are required to monitor the operating state. A drive with the position-detection system can be monitored, for example, for disruptions of the movement of the rotor or for loading of the rotor during operation.

For example, the encoder unit of the position-detection system can be arranged on the rotor, and the signal-detection unit can be arranged in a positionally fixed fashion along the guide system. In such a case, all the components of the drive, with which electrical contact has to be made for the operation of the drive, in particular the drive coils and the signal-detection unit, can be arranged in a positionally fixed fashion along the guide system. This permits the rotor to be embodied passively, that is to say without active electrical or electronic components.

A method for detecting an operating state of a drive having a rotor which can move along a path comprises, as a step, generating a first position signal and a second position signal by means of a signal-processing device of a position-detection system on the basis of a relative position of an encoder unit of the position-detection system and a signal-detection unit of the position-detection system. As a further step, the method comprises determining a distance, directed transversely with respect to the path, between the encoder unit and the signal-detection unit on the basis of amplitude values of the first and second position signals by means of the signal-processing device. A further step of the method comprises detecting an operating state of the drive on the basis of the distance.

Since the operating state of the drive is detected on the basis of the distance between the encoder unit and the signal-detection unit, the operating state of the drive can easily be monitored by means of the position signals of the position-detection system. In particular, for the implementation of the method there is advantageously no need for additional sensors on the rotor or along the path, and the overall design of the drive can be kept relatively simple. In addition, it is advantageously possible to determine the operating state on the basis of the position signals even during a movement of the rotor. As a result, within the scope of the monitoring of the operating state it is also possible to determine the presence or a weight of a payload which has been conveyed by the rotor, or a loss of the payload during the conveying process can be detected. If a longitudinal position of the rotor along the path is detected on the basis of the first and second position signals, like the distance between the encoder unit and the signal-detection unit, the distance and the longitudinal position can advantageously easily be correlated with one another in order to determine the operating state.

According to one aspect of the method, the detection of the operating state of the drive comprises determining a frequency and/or an amplitude of a variation of the distance.

Determining the frequency and/or amplitude of the variation of the distance advantageously permits conclusions to be drawn easily about the cause of the disruption of the movement and therefore the operating state of the drive. For example, distance variations which repeat after, in each case, one revolution of a roller of a bearing element, embodied as a roller arrangement, of the carriage, indicate a defect in at least one of the rollers or in a roller bearing. In contrast, distance variations which repeat after, in each case, one revolution of the rotor about an enclosed path, indicate a local defect in the guide system. In this way, defects, in particular wear phenomena, of the drive can advantageously be detected and analyzed easily.

According to one aspect of the method, the detection of the operating state of the drive comprises detecting an external force action on the encoder unit or the signal-detection unit. As a result, operating states of the drive, which include loading of the rotor with a payload, can advantageously be monitored by means of the position-detection system. For example, a weight of the payload can be used to detect the operating state.

BRIEF DESCRIPTION OF THE DRAWINGS

The invention will be explained in more detail below with reference to figures, in which, in each case in a schematic illustration.

DETAILED DESCRIPTION

Figure 1:
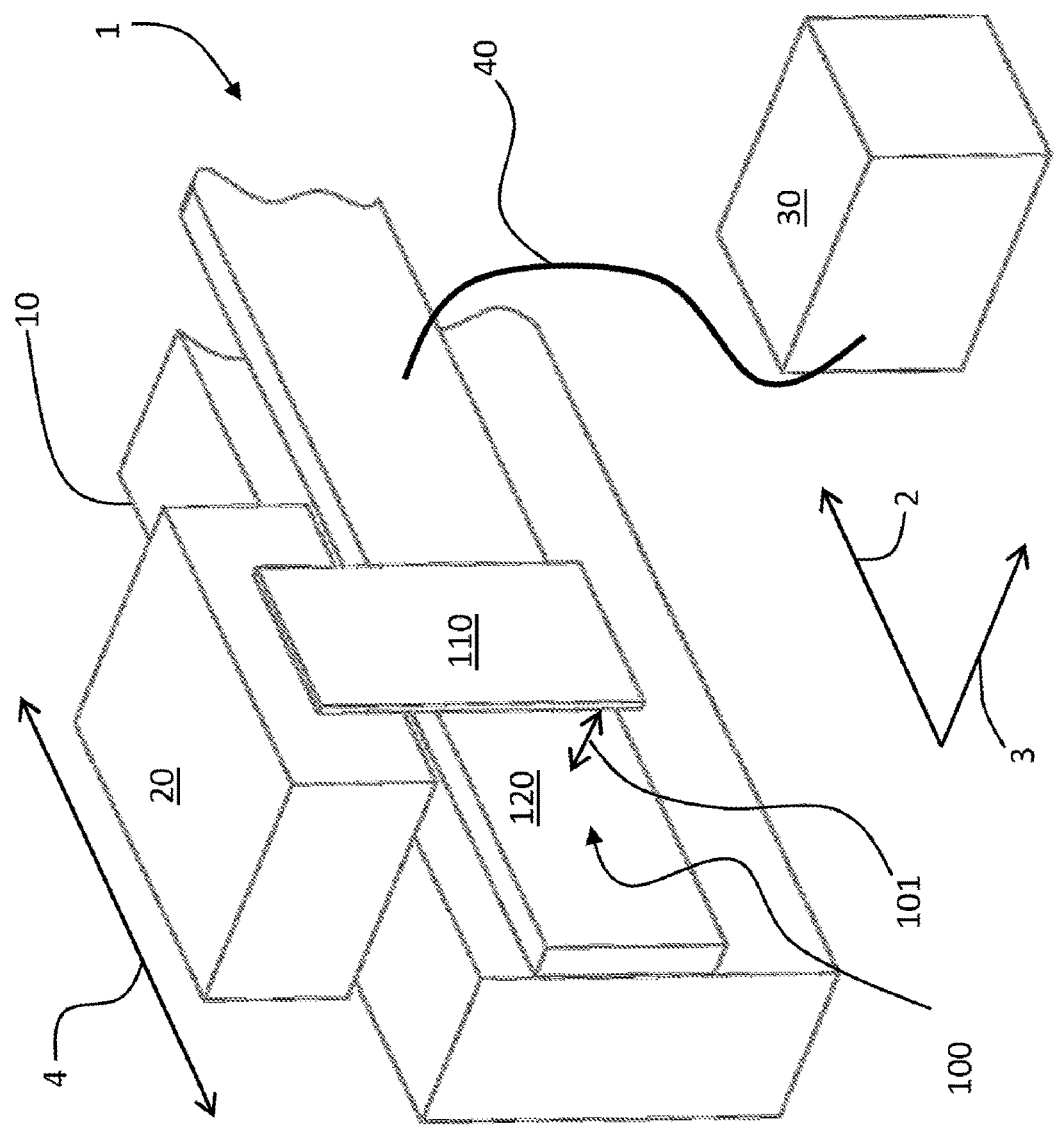
FIG. 1 shows a spatial view of a first drive with a position-detection system.

FIG. 1 shows a schematic illustration of a first drive 1. The first drive 1 comprises a rotor 20 which can move along a path 4, and a carrier unit 10 which is arranged along the path 4. The rotor 20 is guided along the path 4 by a guide system (not illustrated in FIG. 1). Such a guide system can have guide rails which are arranged, for example, along the carrier unit 10 and attached thereto and roller arrangements which are attached to the rotor 20. The rollers of the roller arrangements can be designed to roll on rolling faces of the guide rails. However, the drive 1 can also have a guide system which is designed to guide the rotor 20 in a fluid-mounted, slide-mounted, gas-mounted, in particular air-mounted, or magnetically mounted fashion along the path 4.

The carrier unit 10 is illustrated as a straight path segment in FIG. 1. However, the first drive 1 can also be designed in such a way that the path 4 has a curvature or is embodied in an enclosed fashion. For this purpose, for example, straight, bent or curved carrier units can be arranged along the path 4. These carrier units can be arranged, for example, adjoining one another in an essentially seamless fashion and can bear, for example, bent or curved guide rails. Such carrier units can also be referred to as carrier modules or drive modules.

The drive 1 also comprises a position-detection system 100 which is designed to determine a longitudinal position of the rotor 20 along the path 4 and therefore along the carrier unit 10. The position-detection system 100 comprises a signal-detection unit 120 which is arranged along the path 4, an encoder unit 110 which is arranged on the rotor 20, and a signal-processing device 30. The signal-processing device 30 is connected via a data connection 40 to the first signal-detection unit 120. The data connection 40 can be, for example, a network connection, in particular an Ethernet connection. The data connection 40 can, however, also be based on a different data transmission technology, and can be embodied, for example, as a radio link.

The encoder unit 110 is arranged on the rotor 20 in such a way that the encoder unit 110 is at a distance 101 from the signal-detection unit 120 in a transverse direction 3 which is oriented transversely with respect to the path 4 and therefore perpendicularly with respect to a longitudinal direction 2 which is defined by the path 4 or the direction of movement of the rotor 20. The signal-detection unit 120 and the encoder unit 110 are therefore separated by an air gap whose width corresponds to the distance 101. In the event of a movement of the rotor 20 along the path 4, the encoder unit 110 which is attached to the rotor 20 is also moved and essentially moves past the signal-detection unit 120 at a distance 101.

The encoder unit 110 can comprise, for example, a carrier plate, for example made of plastic or a metal. In such a case, the encoder unit 110 can, as illustrated in FIG. 1, have a significantly smaller extent in the transverse direction 3 than in the longitudinal direction 2. Furthermore, the encoder unit 110 can comprise an encoder element which can be arranged on the carrier plate and interacts with the first signal-detection unit 120, in order to generate position signals for determining a longitudinal position of the rotor 20 along the path 4.

The signal-detection unit 120 extends in the longitudinal direction 2 along the path 4, essentially over the entire movement path of the rotor 20 on the carrier unit 10. As a result, the signal-detection unit 120 can interact with the encoder unit 110 over the entire movement path, and position signals movement path can be generated on the basis of the longitudinal position of the rotor 20 on the path 4 over the entire movement path.

In order to generate the position signals, the signal-detection unit 120 transmits position data, for example in the form of voltage values, in particular differential voltage values, to the signal-processing device 30 via the data connection 40. The signal-processing device 30 then generates the position signals on the basis of the position data.

The signal-processing device 30 generates at least a first and a second position signal in order to determine the longitudinal position of the rotor 20. The first and second position signals each vary periodically when the rotor 20 is displaced along the path 4. The first position signal can be described by means of a first phase value and a first amplitude value, and the second position signal can be described by means of a second amplitude value and a second phase value. For example, in the event of a movement of the rotor 20 along the path 4, the first and second position signals can carry out a harmonic oscillation, a rectangular oscillation, a triangular oscillation or a sawtooth oscillation.

The first position-detection system 100 is embodied here in such a way that a displacement of the rotor 20 along the path 4 essentially brings about a change in the first and second phase values, but does not bring about a change in the first and second amplitude values. In particular, changes in the first and second phase values can each be essentially proportional to a distance traveled by the rotor 20 along the path. Furthermore, the position-detection system 100 is embodied in such a way that a change in the distance 101 between the encoder unit 110 and the first signal-detection unit 120 essentially brings about a change in the first and second amplitude values, but does not bring about a change in the first and second phase values.

If the phase values of the first and second position signals depend essentially only on the longitudinal position of the rotor 20, and the amplitude values of the first and second position signals depend essentially only on the distance 101 between the encoder unit 110 and the first signal-detection unit 120, the longitudinal position of the rotor 20 and the distance 101 can be determined independently of one another.

Independent determination of the distance 101 and longitudinal position is easily possible in particular if, in the event of a displacement of the rotor 20, the first and second position signals each carry out a harmonic oscillation with the same period or frequency and constant mutual phase offset at 90° along the path. In such a case, one of the position signals, for example the first position signal, can also be referred to as a sine position signal, and the other, for example the second position signal, can be referred to as the cosine position signal.

The profile of the first position signal can then be described by a sine function, and the profile of the second position signal can be described by a cosine function. The sine function and the cosine function have here a common phase value, that is to say the same argument, for example the phase value of the first position signal. The longitudinal position of the rotor 20 can then be determined from the ratio of the sine position signal with respect to the cosine position signal, since this ratio is proportional to the tangent of the common phase value or the argument of the sine function and cosine function. In particular, a change in the distance 101, or a resulting change in the first and second amplitude values, does not influence the determination of the longitudinal position.

The amplitudes of the sine position signal and of the cosine position signal depend on the distance 101 between the encoder unit 110 and the signal-detection unit 120. The distance 101 between the encoder unit 110 and the first signal-detection unit 120 can be determined particularly easily from the sum of the absolute square of the sine position signal and of the absolute square of the cosine position signal, that is to say the square sum of the sine position signal and of the cosine position signal. Since the squares of the sine function and of the cosine function add up to one, the square sum of the sine position signal and the of the cosine position signal corresponds to the square of the amplitudes of the sine position signal and of the cosine position signal. In particular, the square sum of the two signals is independent of the common phase value or of the longitudinal position of the rotor 20 along the path 4, and therefore is constant over the entire movement path of the rotor 20 given a constant distance 101.

In the first position-detection system 100, the first signal-detection unit 120 is designed to transmit the position data via the data connection 40 to the signal-processing device 30 of the first position-detection system. The signal-processing device 30 is in turn designed to determine, on the basis of the received position data, the position signals and the longitudinal position of the rotor 20 along the path 4 and the distance 101 on the basis thereof. However, modules of the signal-processing device which carry out the determination of the longitudinal position of the rotor and/or the determination of the distance 101 can also be arranged in the first signal-detection unit. In this case, only the detected longitudinal position and the determined distance 101 are transmitted to other systems of the drive 1 by the signal-detection unit 120.

The first position-detection system 100 can be based on different physical principles for the generation of the first and second position signal. If the first position-detection system 100 is a magnetic position-detection system, the encoder unit 110 can comprise, for example, encoder elements which are embodied as permanent magnets. For example, the encoder unit 110 can have a plurality of permanent magnets which are arranged adjacently and have alternating polarity. In one magnetic position-detection system, Hall sensors or magneto-resistive elements can be arranged in the first signal-detection unit 120, in the longitudinal direction 2 along the path 4. The Hall sensors or magneto-resistive elements can be designed to detect the magnetic field of the encoder elements of the encoder unit, and to generate the position signals or the position data on the basis of the measured values.

If the first position-detection system 100 is embodied as an optical position-detection system, the encoder unit 110 can comprise as an encoder element a light source, for example a light-emitting diode or a laser diode, and the first signal-detection unit 120 can comprise photodetectors which are arranged along the path 4. The photodetectors can detect here the light which is emitted by the light source, and can generate the position signals on the basis of the received light intensity. Alternatively, both light sources and photodetectors can be arranged lying opposite one another on the first signal-detection unit 120, and the encoder unit 110 can be designed to shade the photodetectors from the light sources when the rotor passes by in order to generate the position signal by means of encoder elements.

Figure 2:
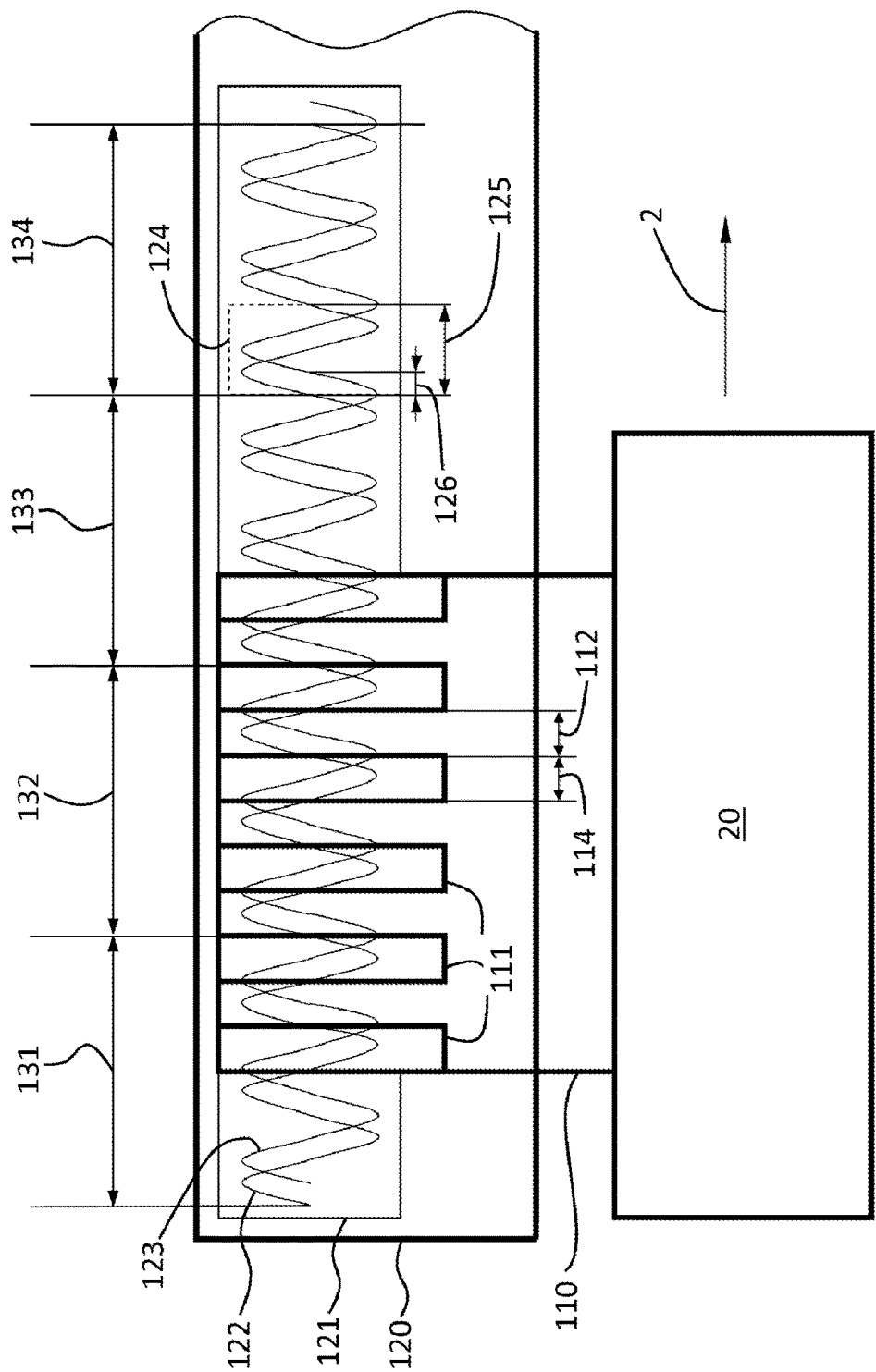
FIG. 2 shows a view of the position-detection system with an encoder unit and a first signal-detection unit.

If the first position-detection system 100 is an inductive position-detection system, the encoder unit 110 and the first signal-detection unit 120 can be embodied as outlined in FIG. 2. The illustrated embodiment corresponds here largely to the position-detection system disclosed in laid-open patent application DE102012204917A1.

The first signal-detection unit 120 comprises an exciter coil 121 which is of essentially rectangular design and extends along the path 4. A first reception coil pair 131, a second reception coil pair 132, a third reception coil pair 133 and a fourth reception coil pair of the first signal-detection unit 120 are arranged within the exciter coil 121. The reception coil pairs 131, 132, 133, 134 each comprise a sine receiver coil 122 and a cosine receiver coil 123, which are illustrated in simplified form in FIG. 2 as sinusoidal or cosinusoidal lines.

The first exciter coil 121, the sine receiver coils 122 and the cosine receiver coils 123 are arranged in parallel with one another, that is to say the surfaces which are surrounded by the coils 121, 122, 123 are oriented in parallel with one another. The exciter coil 121, the sine receiver coils 122 and the cosine receiver coils 123 can be embodied, for example, as metallic conductor tracks on a printed circuit board or some other suitable insulating substrate. In this context, the exciter coil 121, the sine receiver coils 122 and the cosine receiver coils 123 can also comprise a plurality of adjacent conductor tracks which run in parallel with one another.

The first position signal or the sine position signal is generated from signals of the sine receiver coils 122 of the reception coil pairs 131, 132, 133, 134, while the second position signal or the cosine position signal is generated from signals of the cosine receiver coils 123 of the reception coil pairs 131, 132, 133, 134.

If no differences are described below, the sine receiver coils 122 and the cosine receiver coils 123 are of identical design. In particular, the sine receiver coils 122 and the cosine receiver coils 123 have a periodic geometry and are arranged on the signal-detection unit 120 in such a way that a sinusoidal base element 124, which defines a period 125 of the geometry of the sine receiver coils 122 and of the cosine receiver coils 123, repeats periodically along the path 4. Both the individual sine receiver coils 122 and the individual cosine receiver coils 123 each comprise three of the base elements 124. The sine receiver coils 122 of the individual reception coil pairs 131, 132, 133, 134 are each arranged essentially adjacent to one another, and likewise the cosine receiver coils 123 of the individual reception coil pairs 131, 132, 133, 134 are each arranged essentially adjacent to one another. Furthermore, the cosine receiver coils 123 are arranged with a spatial phase offset 126 with respect to the sine receiver coils 122, which offset 126 corresponds to a quarter of the period 125.

Figure 3:
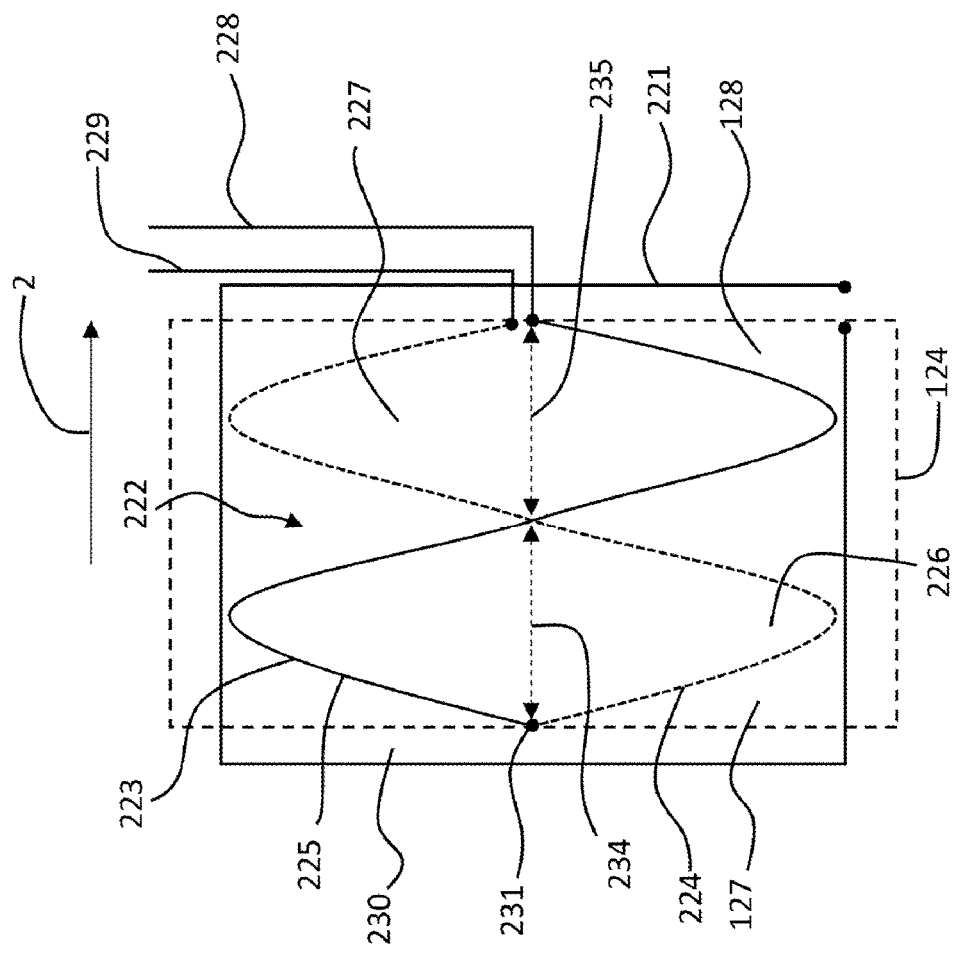
FIG. 3 shows a view of a printed circuit board of the signal-detection unit with a receiver coil and an exciter coil.

The precise embodiment of the sine receiver coils 122 and of the cosine receiver coils 123 is illustrated in FIG. 3 on the basis of a single-period receiver coil 222, which is embodied like the sine receiver coils 122 and the cosine receiver coils 123, but comprises merely a single one of the base elements 124. The single-period receiver coil 222 has a sinusoidal positive coil section 223 and a likewise sinusoidal negative coil section 224 and is arranged on a printed circuit board 230. The printed circuit board comprises a suitable electrically insulating substrate, for example composed of a glass fiber reinforced plastic and electrically conductive conductor tracks which are arranged on this substrate and can comprise, for example, copper.

The positive and the negative coil sections 223, 224 are each connected to one another at a first end by a common contact point 231 and are otherwise embodied electrically insulated from one another. For example, the positive and the negative coil sections 223, 224 can be embodied as electrically conductive conductor tracks on different layers of the printed circuit board 230, and the contact point 231 can be embodied as a via of the printed circuit board 230.

The first contact point bears against a first side 127 of the base element 124. The negative coil section 224 extends from the contact point 231 in antiphase with respect to the positive coil section 223. At a distance from the contact point 231 which corresponds to half the period 125, that is to say in the center of the base element 124, the positive and negative coil sections 223, 224 intersect. After a further half of the period 125, that is to say on a second side 128 of the base element 124 lying opposite the first side 127, the positive coil section 223 and the negative coil section 224 each end at a second end and make contact with a positive signal-detection line 228 or a negative signal-detection line 229.

Overall, the positive and the negative coil sections 223, 224 form a sinusoidal surface border 225. The sinusoidal surface border 225 encloses a first detection surface 226 within a first half period 234 of the period 125. Within a second half period 235 of the period 125, the sinusoidal surface border 225 encloses a second detection surface 227.

In the case of receiver coils which, like the receiver coils 122, 123 of the first position-detection system, comprise more than one base element 124, the positive signal detection line and the negative signal detection line do not end after a distance which corresponds to the period 125. Instead, the positive signal detection line and the negative signal detection line are continued in a sinusoidal shape for a further integral number of periods 125 until they make contact with the positive or the negative signal detection line 228, 229.

In addition to the single-period receiver coil 222, FIG. 2 illustrates the second exciter coil 221 which, unless differences are described below, is embodied like the first exciter coil 121. The second exciter coil 221 can, like the single-period receiver coil 222, also be arranged on the printed circuit board 230 and be embodied as a metallic conductor track. The second exciter coil 221 is of rectangular design and surrounds the single-period receiver coil 222.

The measuring principle of the first position-detection system 100 will be explained briefly below with reference to the arrangement shown in FIG. 3, composed of a single-period receiver coil 222 and a second exciter coil 221. A flow of current in the second exciter coil 221 generates a magnetic field which is oriented perpendicularly with respect to the surface normal of the printed circuit board 230, that is to say perpendicularly with respect to the surface normal of the first detection surface 226 or the second detection surface 227. The surface border 225, formed by the positive and negative coil sections 223, 224, respectively runs around the first detection surface 226 and the second detection surface 227 in opposite directions. Furthermore, the first detection surface 226 and the second detection surface 227 are of equal size. Therefore, currents induced in the first and second detection surfaces 226, 227 compensate one another, and a differential voltage which is tapped between the positive signal detection line 228 and the negative signal detection line 229 is virtually zero. If the magnetic field is then disrupted in the region of one of the detection surfaces 226, 227, the induced currents no longer cancel one another out and the differential voltage has a value which is different from zero.

In order to use this principle for position detection, the encoder unit 110 of the first position-detection system 100 comprises as encoder elements six damping elements 111 as are illustrated in FIG. 2. These damping elements 111 can be embodied, for example, as metallic strips on a printed circuit board of the encoder unit 110. If the encoder unit 110 is located above one of the receiver coils 122, 123, the damping elements 111 disrupt a magnetic field generated by a flow of current through the first exciter coil 121, and a differential voltage which is different from zero drops across the signal detection lines 228, 229 of the corresponding reception coils 122, 123.

As illustrated in FIG. 2, the damping elements 111 have in the longitudinal direction 2 a width 114 which corresponds to half the period 125, while in the longitudinal direction 2 they are at a distance 112 from one another which also corresponds to half the period 125. This results in the differential voltages which are tapped at the signal detection lines 228, 229 of the sine receiver coils 122 and the cosine receiver coils 123 carrying out a harmonic oscillation in the event of a movement of the encoder unit 110 in the longitudinal direction 2 along the signal detection line 120. In this context, the differential voltage which is tapped at the cosine receiver coils 123 of one of the receiver coil pairs 131, 132, 133, 134 is phase shifted in each case by 90° with respect to the differential voltage which is tapped at the sine receiver coil 122 of the corresponding receiver coil pair.

The differential voltages which are tapped at the sine receiver coils 122 and the cosine receiver coils 123 of the receiver coil pairs 131, 132, 133, 134 form the position data which is transmitted from the first signal-detection unit 120 to the signal-processing device 30. The signal-processing device 30 generates the first position signal, which can also be referred to as a sine position signal, on the basis of the differential voltages of the sine receiver coils 122. The signal-processing device 30 forms the second position signal, which can also be referred to as a cosine position signal, on the basis of the differential voltages of the cosine receiver coils 123.

In order to generate the first and second position signals, the differential voltages are sampled by the signal-detection unit 120 and digitized. The digitized values of the differential voltages are transmitted as position data via the data connection 40 to the signal-processing device 30 which generates the first and second position signals on the basis of the differential voltages. Alternatively, a module of the signal-processing device 30, which module generates the position signals, can also be arranged on the carrier, with the result that only the first and second position signals are then transmitted via the data connection 40. The module can be a hardware module and/or a software module.

Since the first position signal and second position signal each carry out harmonic oscillations and have a phase shift of 90°, the profile of the first position signal can be described by a sine function, and the profile of the second position signal can be described by a cosine function, with a common phase value or a common argument. The first position-detection system 100 is embodied in such a way that a first amplitude value of the first position signal and a second amplitude value of the second position signal are of equal size. In particular, the detection surfaces which are surrounded by the surface borders of the sine receiver coils 122 and the cosine receiver coils 123 are of equal size.

If the rotor 20 and with it the encoder unit 110 moves along the path, the change in the phase value of the first and second position signals which is caused as a result is proportional to the distance traveled by the rotor 20. The size of the amplitude value of the first and second position signals depends primarily on the size of the disruption of the magnetic field of the first exciter coil by the damping elements 111. In this respect, the amplitude value of the first and second position signals are influenced by the distance 101 between the encoder unit 110 and the signal-detection unit 120, but not by the longitudinal position of the rotor 20 along the path 4.

The longitudinal position of the rotor 20 along the path 4 can be determined particularly easily from the ratio of the first position signal with respect to the second position signal, since this ratio is proportional to the tangent of the phase value or of the argument of the sine function and of the cosine function which describe the first and second position signals. The amplitude values of the first and second position signals are not included in the determination of the longitudinal position of the rotor 20 here.

The distance 101 between the encoder unit 110 and the signal-detection unit 120 can be determined on the basis of the sum of the absolute squares of the first and second position signals or, expressed in other words, on the basis of the square sum of the first and second position signals. The square sum of the first and second position signals is independent of the phase value of the position signals or the longitudinal position of the rotor 20 along the path 4 and is therefore constant over the entire movement path of the rotor 20 given a constant distance 101.

In another embodiment of the invention, in order to detect the distance 101 it is also possible to use just a first and a second position signal which have been generated on the basis of the differential voltages of just one of the reception coil pairs 131, 132, 133, 134. For example, when the rotor moves along the path 4, it is always possible to use for the detection of the distance 101 that reception coil of the reception coil pairs 131, 132, 133, 134 which is covered completely by the encoder unit 110 or the damping elements 111.

Instead of arranging the encoder unit 110 on the rotor 20 and the signal-detection unit 120 in a positionally fixed fashion along the path 4 as illustrated in FIG. 1, the signal-detection unit can also be arranged on the rotor 20 and the encoder unit along the path 4. In such a case, the signal-detection unit can be made shorter than as illustrated in FIGS. 1 and 2, and can comprise, for example, just one reception coil pair. The encoder unit could be longer in such a case than the encoder unit 110 illustrated in FIGS. 1 and 2 and could comprise damping elements which are arranged along the entire path 4. With such an embodiment of the position-detection system, it is necessary to transmit signals from the rotor 20 to the signal-processing device 30, which can be implemented, for example, by cabling which is carried along during a movement of the rotor, or by means of a radio link.

The drive 1 can also comprise more than the one rotor 20 which can move along the path 4. In this case, the position-detection system 100 comprises a plurality of encoder units which are embodied like the encoder unit 110 and are each mounted on one of the plurality of rotors. As a result, the position-detection system 100 can generate a first and a second position signal for each of the plurality of rotors in the same way as was described in relation to FIGS. 1, 2.

The longitudinal position of the rotor 20 can be used for open-loop or closed-loop control of the position of the rotor 20 along the path 4. For this purpose, the first and second position signals can be transmitted from the signal-processing device 30 to a superordinate controller of the drive. Alternatively, the signal-processing device 30 can also detect the longitudinal position of the rotor 20 on the basis of the first and second position signals and transmit the longitudinal position to the superordinate controller. For the open-loop or closed-loop control of the longitudinal position of the rotor 20 along the path 4, the distance 101 between the encoder unit 110 and signal-processing unit 120 is not processed. The described determination of the longitudinal position on the basis of the ratio of the first position signal with respect to the second position signal also ensures that the distance 101 does not influence the value of the longitudinal position of the rotor 20 along the path 4, which was determined by the first position-detection system 100.

The distance 101, determined from the square sum of the first and second position signals, between the signal-detection unit 120 and the encoder unit 110 which is arranged on the rotor 20 can be used to detect an operating state of the drive 20. The operating state can comprise here all the states of the drive 1, the change in which has an effect on the distance 101 between the encoder unit 110 and the signal detection unit 120. These can be, in particular, states of the rotor 20, such as loading of the rotor 20 with a payload, or states or disruptions of the guide system which guides the rotor 20 along the path 4. For example, the guide system may have a defect on a roller or a guide rail, as a result of which defect the movement of the rotor 20 is disrupted and it is briefly made to move in the transverse direction 3.

The embodiment of the first position-detection system 100 as an inductive position-detection system with an encoder unit 110 arranged on the rotor permits, in particular, contactless determination of the longitudinal position of the rotor 20 and of the distance 101. There is no need for a data connection between the rotor 20 and the signal-processing device 30. The rotor 20 can also be embodied in an electrically passive fashion, with the result that no active electronic components, which would have to be supplied with an electrical supply voltage, have to be arranged on the rotor 20.

The signal-processing device of the position-detection system can also be of modular design. In such a case, hardware modules or software modules which make available functions which are carried out by the signal-processing device 30 can be arranged in a decentralized fashion on other elements or components of the first drive 1 or integrated therein. For example, the position signals can already be generated in a decentralized fashion in the signal-detection unit 120 on the basis of the position data, for example the differential voltages. In addition, the distance and/or the longitudinal position of the rotor can also be determined in a decentralized fashion in the signal-detection unit 120. The operating state can also be detected, for example, in a decentralized fashion in the signal-detection unit 120. Alternatively, some of these functions, or all of these functions, can also be carried out in a superordinate controller of the first drive 1, which can comprise, for example, an industrial computer or a stored programmable controller.

Figure 4:
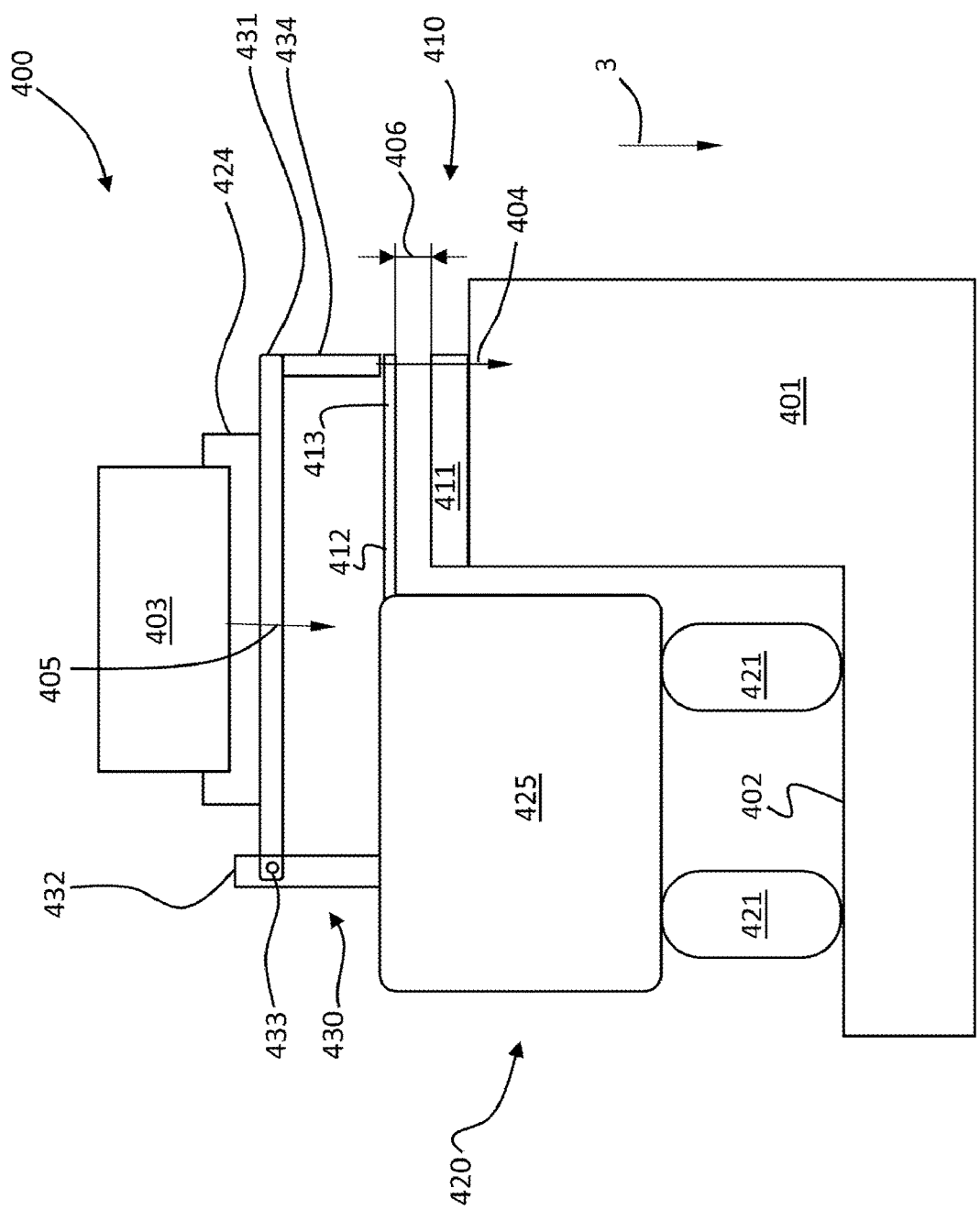
FIG. 4 shows a sectional view of a second drive with a position-detection system.

FIG. 4 illustrates a sectional view of a second drive 400 which, unless differences become apparent below, is embodied in the same way as the first drive 1. The second drive 400 comprises a carrier unit 401 and a rotor 420. Unless differences become apparent below, the carrier unit 401 and the rotor 420 is embodied in the same way as the carrier unit 10 and the rotor 20 of the first drive 1. Furthermore, the second drive 400 comprises a position-detection system 410 with a signal-detection unit 411 and an encoder unit 412. Unless differences become apparent below, the position-detection system 410, the signal-detection unit 411 and the encoder unit 412 are embodied in the same way as the position-detection system 100, the signal-detection unit 120 and the encoder unit 110 of the first drive 1.

The drive 400 comprises a guide system which is designed to guide the rotor 420 along a path which runs perpendicularly with respect to the plane of the image in FIG. 4. The guide system comprises two rollers 421 which are mounted on a rotor body 425 of the rotor 420 and a running surface 402 which is embodied on the carrier unit 401. The rollers 421 of the rotor 420 roll on the running surface 402 of the carrier unit 401, with the result that the rotor 420 can move along the path.

The rotor 420 is designed to convey a payload 403. For this purpose, the rotor 420 has a load-receiving device 424 which is designed to receive the payload 403 and/or to secure it by means of the rotor 420 during the conveying process. The load-receiving device 424 can be embodied, for example, as a tray or a carrier plate in or on which the payload can be arranged.

The encoder unit 412 of the position-detection system 410 of the second drive 400 is mounted laterally on the rotor body 425 and is oriented essentially horizontally. The signal-detection unit 411 is arranged on the carrier unit 401, opposite the encoder unit 412 and likewise oriented essentially horizontally. The horizontal orientation of the signal-detection unit 411 results in the surface normals of the detection surfaces (not illustrated in FIG. 4) of the signal-detection unit 411 being oriented vertically. The transverse direction 3, which is oriented transversely with respect to the path and in which a distance 406 between the encoder unit 412 and the signal-detection unit 411 is detected, is also oriented vertically. In particular, in the case of the drive 400 which is illustrated in FIG. 4 the distance 406 and the transverse direction 3 are oriented in parallel with a weight 405 of the payload 403.

In the description of these and of all further exemplary embodiments of the invention, it is assumed below that a vertical direction is that direction in which gravity acts on the components of the drive or of the position-detection system and a horizontal direction is oriented perpendicularly with respect to the vertical direction.

The load-receiving device 424 is attached to the rotor body 425 of the rotor 420 via a mechanical unit 430. The mechanical unit 430 is designed to transmit the weight 405 of the payload 403 to the encoder unit 412 in such a way that the distance 406 between the encoder unit 412 and the signal-detection unit 413 changes or, to be more precise, decreases, under the influence of an external force action 404 generated by the weight 405.

The mechanical unit 430 comprises a carrying element 431, a carrying element mount 432 and a support element 434. The carrying element mount 432 is arranged on the rotor body 425 and oriented essentially vertically. The carrying element 431 can be, for example, a plate or a carrier arm. The carrying element 431 is oriented essentially horizontally and is attached on one side via a rotatable connection 433 to an upper end, remote from the rotor body 425, of the carrying element mount 432. On an opposite side of the carrying element 431, the support element 434 is mounted on the carrying element 431. The carrying element 431 is supported downward, that is to say in the vertical direction on the encoder unit 412, with the support element 434. The load-receiving device 424 is mounted on an upper side, lying opposite the rotor body 425, of the carrying element 431.

The force action 404 on the load-receiving device 424 of the rotor 420, exerted by the weight 405 of the payload 403, brings about a rotation of the carrying element 431 about the rotatable connection 433, with the result that the support element 434 is moved downward and presses on the encoder unit 412, with the result that an external force action 404 is applied to the latter. The encoder unit 412 has an elastic part. For example, a printed circuit board 413, which carries damping elements of the encoder unit 412 and via which the damping elements are attached to the rotor 420, are of partially or completely elastic design. The external force action 404 which is applied to the encoder unit 412 by the mechanical unit 430 then brings about elastic bending of the encoder unit 412 in the transverse direction 3, and the distance 406 between the encoder unit 412 and the signal-detection unit 411 decreases.

Since the position-detection system 410 determines the distance 406, an operating state of the drive 400, which is defined by the presence of the payload 403 on the rotor 420, can be detected by means of the distance 406. For this purpose, the distance 406 can be compared with a reference distance previously determined in the unladen state. If the relationship between the weight 405 of the payload 403 and the distance 406 was previously calibrated, it is also possible to detect and differentiate operating states which are defined by loading of the rotor with payloads of different weights. Within the scope of the detection of the operating state, it is also possible to determine the weight of the payload 403 in accordance with the embodiment of the mechanical unit 430, in particular as a function of distances between the rotatable connection 433 and the load-receiving device 424, on the one hand, and the support element 434, on the other. In this context, the distance between the rotatable connection 433 and the load-receiving device 424, and the distance between the rotatable connection 433 and the support element 434, define a transmission ratio of the mechanical unit 430.

Figure 5:
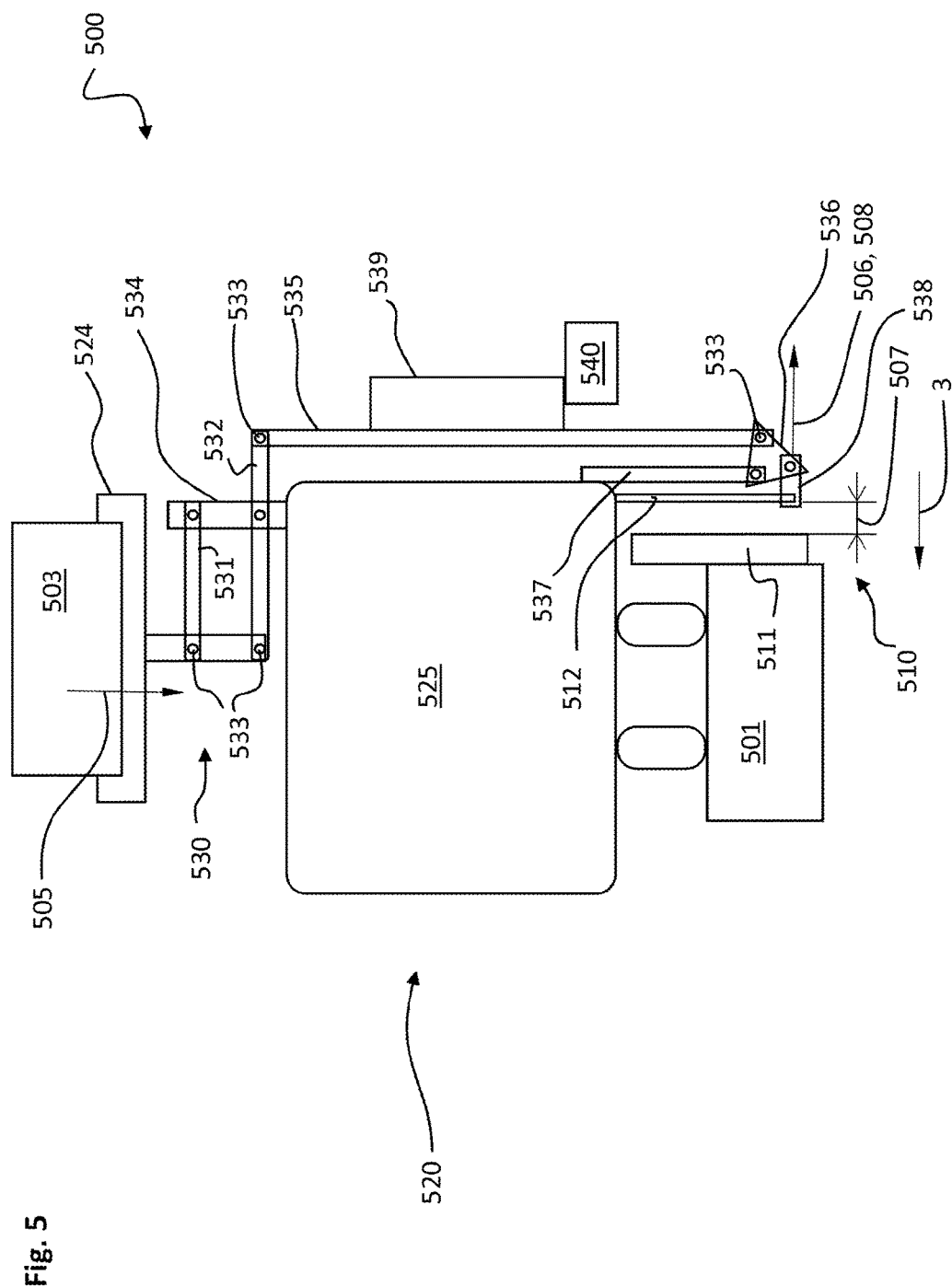
FIG. 5 shows a sectional view of a third drive with a position-detection system.

FIG. 5 illustrates a sectional view of a third drive 500 which, unless differences become apparent below, is embodied in the same way as the first drive 1 and the second drive 400. The third drive 500 comprises a carrier unit 501 and a rotor 520. Unless differences become apparent below, the carrier unit 501 and the rotor 520 are embodied in the same way as the carrier units 10, 401 and the rotors 20, 420 of the first drive 1 or of the second drive 400. Furthermore, the third drive 500 comprises a position-detection system 510 with a signal-detection unit 511 and an encoder unit 512. Unless differences become apparent below, the position-detection system 510, the signal-detection unit 511 and the encoder unit 512 are embodied in the same way as the position-detection systems 100, 410, the signal-detection units 120, 411 and the encoder units 110, 412 of the first drive 1 or of the second drive 400.

The encoder unit 512 of the position-detection system 510 is arranged on a rotor body 525 of the rotor 520 in such a way that the encoder unit 512 is oriented vertically. Opposite the latter, the signal-detection unit 511 is also arranged oriented vertically on the carrier unit 501. As a result, the surface normals of detection surfaces (not illustrated in FIG. 5) of the signal-detection unit 511 are oriented horizontally. The transverse direction 3 in which the distance 507 between the encoder unit 512 and the signal-detection unit 511 is measured is also oriented horizontally.

As a result, the distance 507 can be changed by an external force action only if the external force action has a force component which generates a transverse force acting in the transverse direction 3. A weight 505 of a payload 503 conveyed by the rotor 520 acts merely in the vertical direction, with the result that the weight 505 of the payload 503 does not have such a transverse force component.

In order to generate a transverse force from the weight 505, acting on the rotor 520, of the payload 503, the rotor 520 has a mechanical unit 530. A load-receiving device 524 is attached to the rotor body 525 via the mechanical unit 530 and is designed to receive or carry the payload 503. The load-receiving device 524 is essentially of the same design as the load-receiving device 424. The mechanical unit 530 has an upper lever arm 531 and a lower lever arm 532 which is arranged in the vertical direction below the latter. The upper and lower lever arms 531, 532 are arranged in parallel with one another. The load-receiving device 524 is connected via rotatable connections 533 to the lever arms 531, 532, at ends, lying respectively opposite one another, of the upper and lower lever arms 531, 532. In this context, the lever arms 531, 532 are attached essentially in the vertical direction underneath the center of gravity of the payload 503 or in the center of the load-receiving device 524.

The upper and lower lever arms 531, 532 are each attached to a carrying arm 534 via further rotatable connections. The rotatable connections between the carrying arm 534 and the lever arms 531, 532 are arranged lying one on top of the other here in the vertical direction. The carrying arm 534 is securely connected to the rotor body 525 of the rotor 520 and brings about a connection of the mechanical unit 530 to the rotor 520. The attachment of the load-receiving device 524 to the carrying arm 534 via the upper and lower lever arms 531, 532 makes it possible for the load-receiving device 524 to move in the vertical direction, during which the load-receiving device 524 does not tilt, in contrast to what is the case with the load-receiving device 424 of the second drive 400. Overall, parallelogram guidance of the load-receiving device 524 is therefore implemented through the attachment of the load-receiving device 524 to the supporting arm 534 by means of the upper and lower lever arms 531, 532.

The lower lever arm 532 continues from the rotatable connection 533 to the load-receiving device 524 via the rotatable connection to the carrying arm 534 on the other side of the carrying arm 534 and is also attached there by means of a rotatable connection to a first end of a vertical lever arm 535. The vertical lever arm 535 runs in the vertical direction along the rotor body 525 and is connected to a second end via a rotatable connection to a rotatable deflection element 536. The rotatable deflection element 536 can be embodied, for example, as a disk or as a plate. The rotatable deflection element 536 (illustrated in FIG. 5) is embodied as a triangular plate.

The rotatable deflection element 536 is connected to a deflection mounting element 537 and an activation element 538 by means of a further rotatable connection in each case. The deflection mounting element 537 is securely mounted on the rotor 520, with the result that the deflection element 536 can rotate with respect to the rotor 520 by means of the rotatable connection to the deflection mounting element 537. The activation element 538 engages on the encoder unit 512, at an end of the encoder unit 512 lying opposite the rotor body 525, and said activation element 538 is connected to the encoder unit 512 there, for example. The rotatable connections of the deflection element 536 to the perpendicular lever arm 535, the deflection mounting element 537 and the activation element 538 are arranged on the deflection element 536 in such a way that when there is a vertical upward movement of the perpendicular lever arm 535 the deflection element 536 is rotated about the connection to the deflection mounting element 537 in such a way that the activation element 538 is moved away from the signal-detection device 511 counter to the transverse direction 3. Therefore, the encoder device 512 which is attached to the activation element 538 is also moved or bent away from the signal-detection device 511, and the distance 507 between the signal-detection device 511 and the encoder device 512 increases.

The mechanical unit 530 therefore converts a vertical downward movement of the load-receiving device 524, for example by loading with the payload 503, into a vertical upward movement of the perpendicular lever arm 535 via the lower lever arm 532 of the parallelogram guiding means. The vertical upward movement of the perpendicular lever arm 535 is converted by means of the deflection element 536 into a movement of the activation element 538 which is directed counter to the transverse direction 3, wherein the movement of the activation element 538 is directed away from the signal-detection unit 511. Therefore, a transverse force 506, which applies an external force action 508 to the encoder unit 512 and brings about an increase in the distance 507 between the encoder unit 512 and the signal-detection unit 511, can be generated on the basis of the weight 505 of the payload 503 which acts in the vertical direction.

The size of the transverse force 506 is determined by means of the transmission ratio or lever ratio of the mechanical unit 530. This transmission ratio is determined, on the one hand, by the distance between the carrying arm 524 and the connection of the lower lever arm 532 to the load-receiving device 524, and on the other hand by the distance between the carrying arm 524 and the connection of the lower lever arm 532 to the perpendicular lever arm 535. Furthermore, the transmission ratio is determined by the positioning of the rotatable connections on the deflection element 536.

A counterweight 539, which counteracts the weight 505 of the payload 503, can be mounted on the mechanical unit 530, as illustrated in FIG. 5. In the case of the third drive 500, the counterweight 539 is mounted on the perpendicular lever arm 539. In order to prevent a force action of the mechanical unit 530 on the encoder unit 512 in the unladen state of the rotor 520, the mechanical unit 530 can have a stop 540. The stop 540 bounds the movement of the perpendicular lever arm 535 downward in the vertical direction, for example in that it supports the counterweight 539 in the downward direction, as illustrated in FIG. 5. An attachment of the stop 540 to the non-movable parts of the mechanical unit 530 or to the rotor 520 is not illustrated in FIG. 5. In order also to limit the movement of the perpendicular lever arm 535 upward in the vertical direction, the mechanical unit 530 or the rotor 520 can also have a further stop which can be arranged, for example, at a suitable distance above the counterweight 539.

The counterweight 539 can be dimensioned, for example, in such a way that the perpendicular lever arm 535 begins to move only if the payload 503 exceeds a defined minimum weight. An operating state of the drive 500 in which the minimum weight is exceeded can be detected by determining the distance 507 by means of the first and second position signals. This makes it possible, for example, to monitor the third drive 500 to the effect that a permissible maximum weight of the payload 503, which maximum weight corresponds to the defined minimum weight, is not exceeded during operation. Likewise, it is possible to monitor the third drive 500 to the effect that a permissible minimum weight of the payload 503, which corresponds to the defined minimum weight, is exceeded in certain operating states during operation. The counterweight 539 can also be used to shift the measuring range in which the weight of the payload 503 can be determined, for example in order to be able to detect small variations in weight of different payloads in relation to the overall weight. Overall, the third drive 500 can therefore be monitored with respect to operating states which are characterized by the fact that a predefined weight limit is exceeded or undershot by the payload 503.

Like the third drive 500, the second drive 400 can also have a stop or a plurality of stops at a suitable location in order to limit the force action or movement of the encoder unit 412. Such a stop can be arranged, for example, between the rotor body 425 and the carrying element 431.

Figure 6:
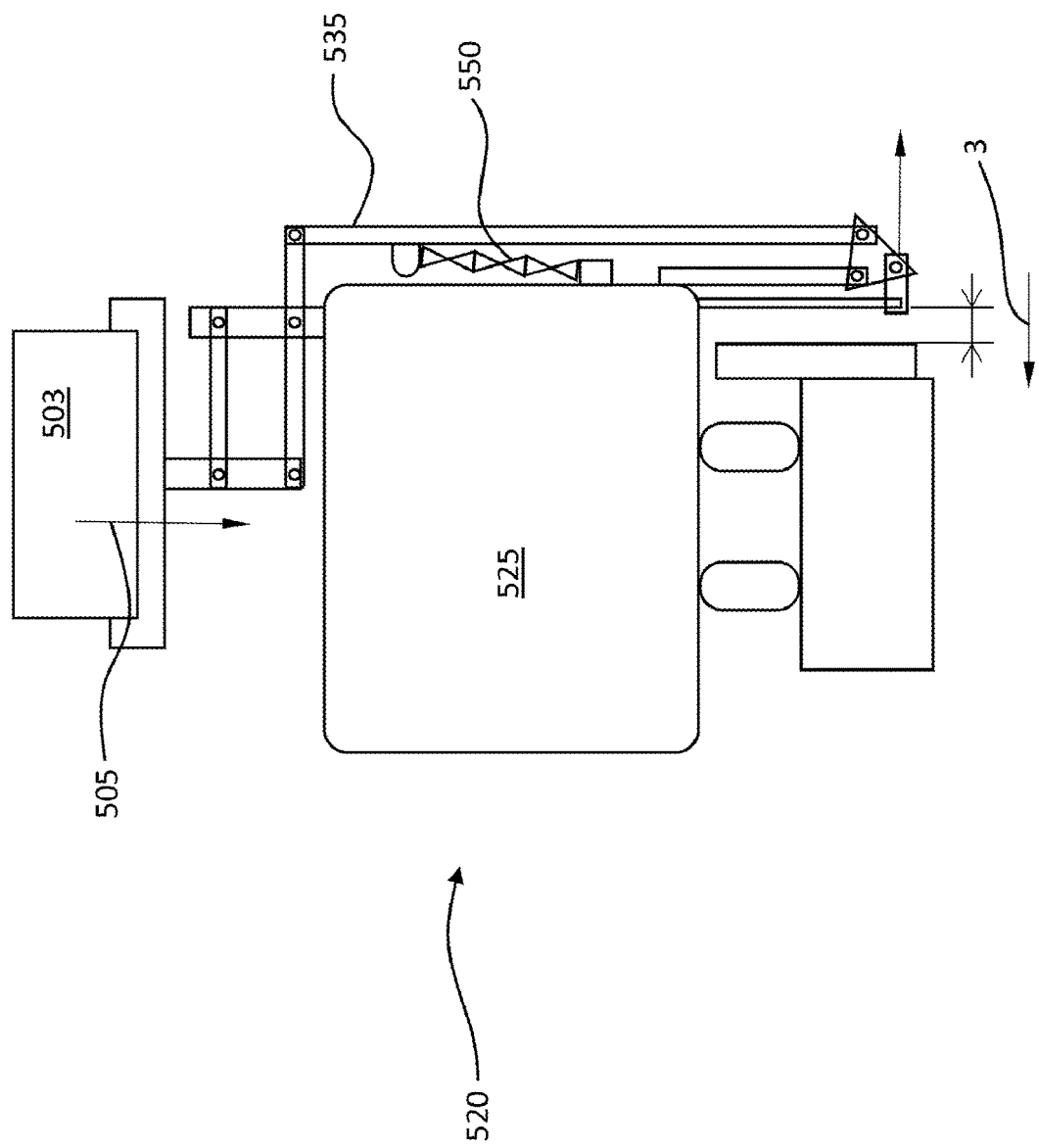
FIG. 6 shows a sectional view of a further embodiment of the third drive.

Instead of the counterweight 539, the mechanical unit 530 can also comprise a spring 550 as is illustrated in FIG. 6. The spring is mounted on the mechanical unit 530 or on the rotor 520 in such a way that when the mechanical unit 530 is loaded with the counterweight 505 of the payload 503 the spring 550 is tensioned and therefore compensates a portion of the weight 505. In the exemplary embodiment illustrated in FIG. 6, the spring 550 is mounted by one end on the perpendicular lever arm 535 and by the other end on the rotor body 525. The spring 550 can, however, also be arranged between suitable elements or lever arms of the mechanical unit 530. If the spring 550 is combined with a stop and is arranged in a pretensioned fashion on the mechanical unit 530, the spring 550 can, exactly like the counterweight 539, be used to ensure that the elements of the mechanical unit 530 do not move until the rotor 520 is loaded with a payload 503 which exceeds a defined minimum weight.

In other embodiments, an external force action which brings about a change in the distance between an encoder unit and a position-detection unit of a position-detection system according to the invention can also be brought about in a different way than by a weight of a payload. For example, the position-detection system and the rotor can be embodied in such a way that a contact of the rotor with a further element of the drive brings about a change in the distance between the encoder unit and the signal-detection unit. The further element can be, for example, a move-on stop or a movable gripper arm for loading and/or unloading the rotor.

Figure 7:
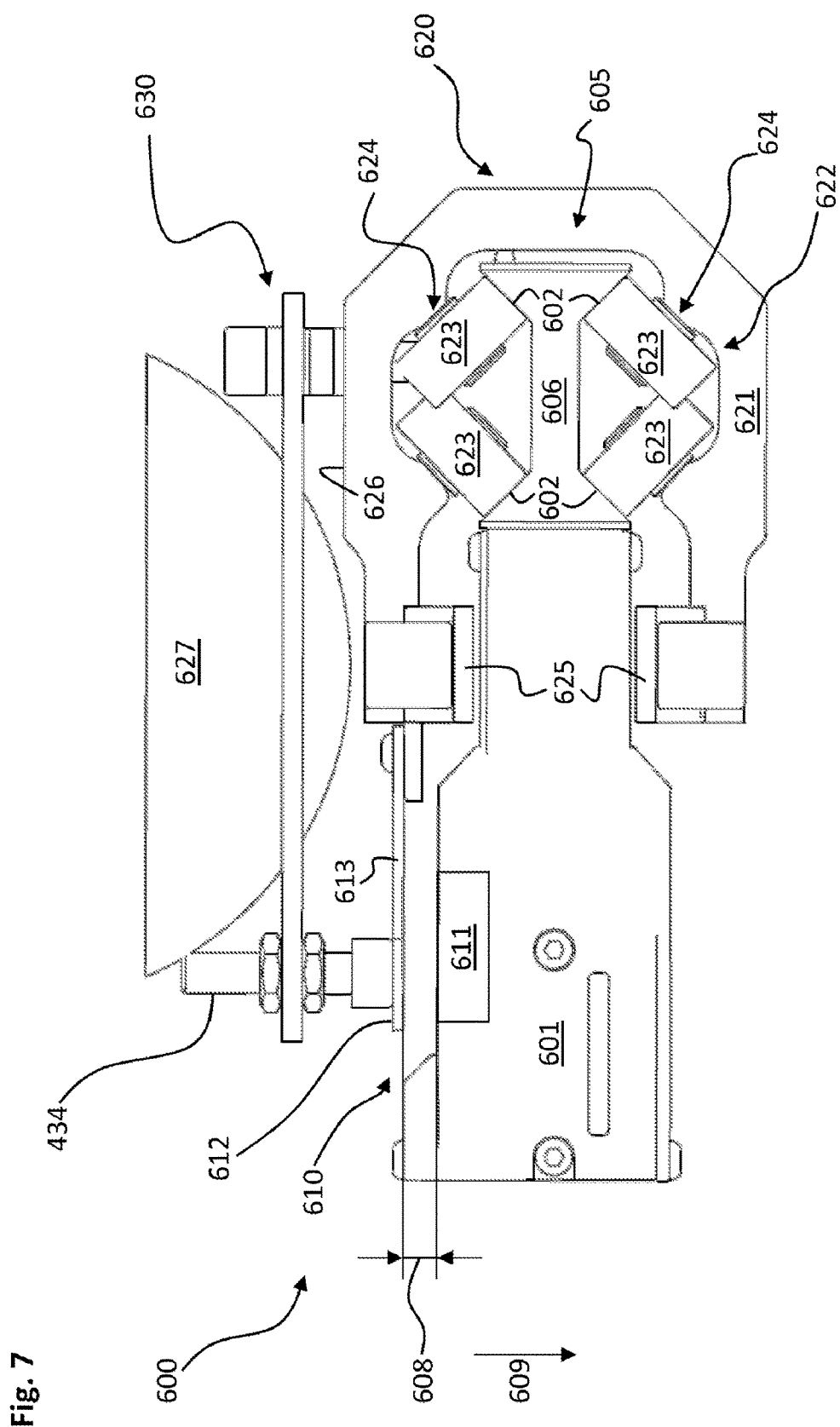
FIG. 7 shows a lateral view of a fourth drive with a position-detection system in the unladen state.

FIG. 7 illustrates a plan view of a fourth drive 600 which, unless differences are apparent below, is embodied in the same way as the first drive 1, the second drive 400 and the third drive 500. The fourth drive 600 comprises a carrier unit 601 and a rotor 620. Unless differences are apparent below, the carrier unit 601 and the rotor 620 are embodied in the same way as the carrier units 10, 401, 501 and the rotors 20, 420, 520 of the first drive 1, of the second drive 400, or of the third drive 500. Furthermore, the fourth drive 600 comprises a position-detection system 610 with a signal-detection unit 611 and an encoder unit 612. Unless differences are apparent below, the position-detection system 610, the signal-detection unit 611 and the encoder unit 612 are respectively embodied in the same way as the position-detection systems 100, 410, 510, the signal-detection units 120, 411, 511 and the encoder units 110, 412, 512 of the first drive 1, of the second drive 400 and of the third drive 500, respectively.

FIG. 7 shows a plan view of the fourth drive 600 in which the path along which the rotor 620 can move is oriented perpendicularly with respect to the plane of the image. In this respect, FIG. 7 shows the rotor 620 viewed from the front and respectively from the rear in the direction of movement.

The fourth drive 600 comprises a guide system 605 which guides the rotor along the path. The guide system 605 comprises a roller arrangement 622 which is arranged on the rotor 620. The roller arrangement 622 comprises a plurality of rollers 623 which are attached to the rotor in a rotatable fashion by means of roller bearings 624. The roller bearings 624 can be, for example, ball bearings. Four of the rollers 623 can be seen in FIG. 7. However, the guide system 605 can comprise further rollers which are arranged behind the illustrated rollers 623 and are spaced apart therefrom. Furthermore, the guide system 605 comprises a guide rail 606. The guide rail 606 is connected securely to the carrier unit 601 on one side and extends, like the carrier unit 601, along the path which predefines the movement of the rotor 620.

The rollers 623 of the roller arrangement 622 are mounted on a rotor body 621 of the rotor 620. The rotor body 621 has a U-shaped profile and encloses the guide rail 606 from a side facing away from the carrier unit 601. The rollers 623 are arranged between the rotor body 621 and the guide rail 606 in such a way that they can roll on the guide rail 606.

The guide rail 606 is embodied essentially as a double T profile. The profile comprises a straight connecting segment, at the ends of which two transverse segments which are oriented perpendicularly with respect to the connecting segment are embodied. The transverse segments are therefore aligned in parallel with one another. Overall, four inner faces of the transverse segments, which are arranged on the sides of the transverse segments facing one another, have an angle of approximately 45° with respect to the connecting segment. The inner faces of the terminating segments form running faces 602 of the guide system 605. The rollers 623 which are mounted on the rotor 620 roll on the running faces 602. The arrangement of the running faces 602 tilted by 45° with respect to the connecting element ensures that movement of the rotor 620 transversely with respect to the path is essentially prevented in the normal operating mode of the fourth drive 600. In order to prevent the rotor 620 from tilting on the rail, further rollers (not illustrated in FIG. 7) are arranged on the rotor 620 behind one or more of the rollers 623.

The fourth drive 600 is embodied as a linear motor. The rotor 620 has a drive magnet 625 on each of the two inner sides, lying opposite one another, of the U-shaped rotor body 621. The drive magnets 625 can be embodied, for example, as permanent magnets. The rotor 620 can comprise further drive magnets (not illustrated in FIG. 7), which are arranged behind the drive magnets 625 in the direction of movement. Part of the carrier unit 601, past which part the drive magnets 625 run when the rotor 620 moves along the path, are located between the drive magnets 625. A plurality of drive coils (not illustrated) of a drive device are arranged along the path in this part of the carrier unit 601. The drive coils are designed to generate a magnetic field which interacts with the drive magnets 625 and therefore generates a driving force which is directed along the path and acts on the rotor 620. For this purpose, for example a multi-phase magnetic alternating field can be generated by the drive coils.

The encoder unit 612 of the position-detection system 610 of the fourth drive 600 is mounted at one end of a limb of the U-shaped rotor body 621. The encoder unit 612 comprises a printed circuit board 613 which is oriented essentially parallel to the limb of the rotor body 621. The encoder unit 612 is oriented in parallel with the carrier unit 601 and moves along the carrier unit 601 when there is a movement of the rotor 620 along the path. In the carrier unit 601, the signal-detection unit 611 of the position-detection system 610 is arranged opposite the encoder unit 612. The signal-detection unit 611 and the encoder unit 612 are arranged at a mutual distance 608 from one another and in parallel with one another.

The carrier unit 601 and the encoder unit 612 are oriented horizontally and the encoder unit 612 runs above the carrier unit 601, viewed in the vertical direction, and along said carrier unit 601. In particular, the distance 608 between the signal-detection unit 611 and the encoder unit 612 and therefore a transverse direction 609 in which the distance 608 is measured is oriented vertically. The vertical direction is at the same time also the direction in which gravity acts on the components of the fourth drive 600.

A load-receiving device 627 is mounted on the rotor body 621 on an upper side 626 of the rotor body 621 by means of a mechanical unit 630. Unless differences are described, the load-receiving device 627 and the mechanical unit 630 are embodied in the same way as the load-receiving device 403 and the mechanical unit 430 of the second drive 400. In particular, the mechanical unit 630 also has the support element 434 with which the mechanical unit 630 rests or is supported on the encoder unit 612. The mechanical unit 630 is attached to the rotor body 621 on a side of the mechanical unit 630 lying opposite the support element 434. The load-receiving device 627 is embodied as a tray in which a payload can be placed.

Figure 8:
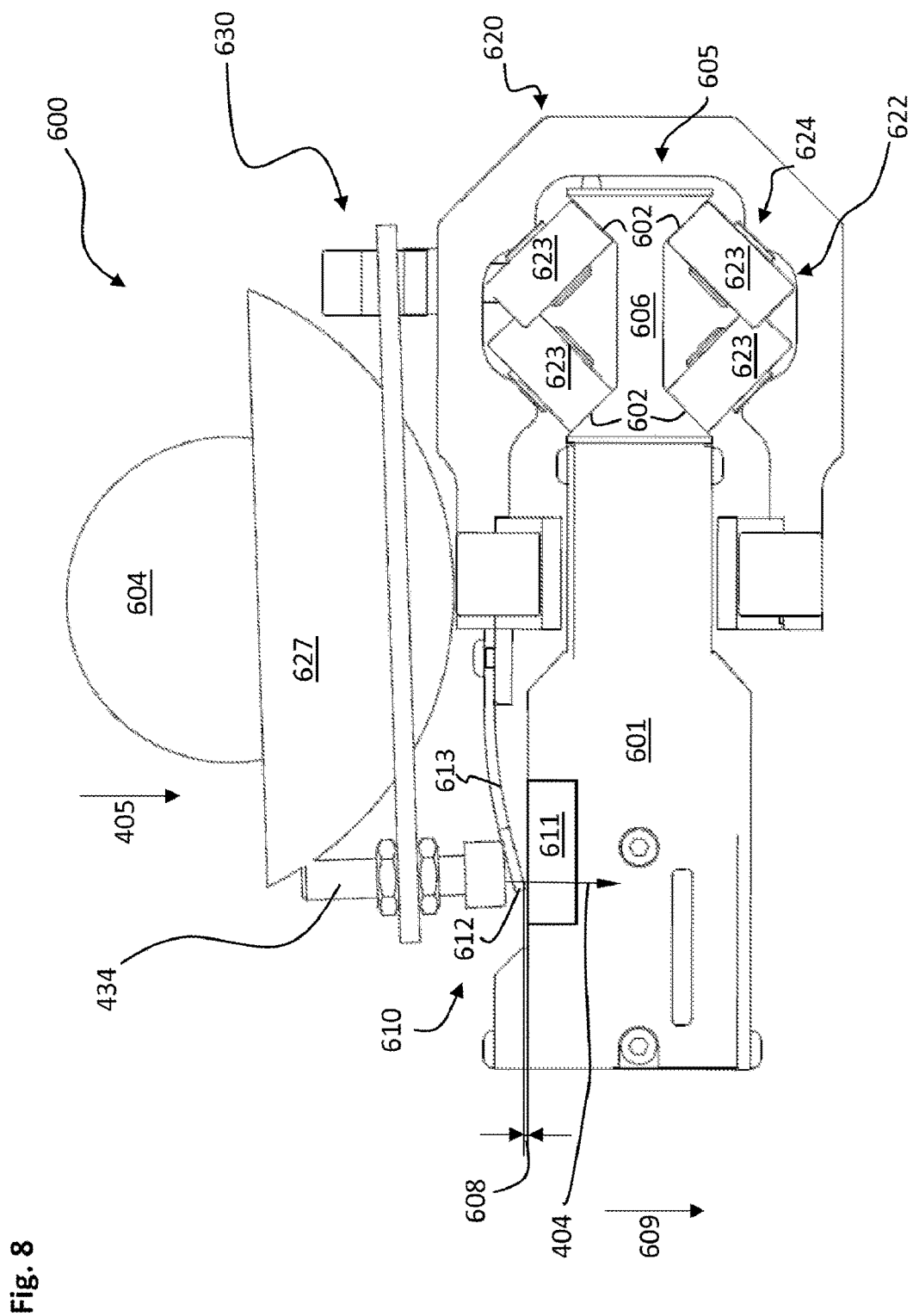
FIG. 8 shows a lateral view of the fourth drive in the laden state.

FIG. 7 shows the rotor 620 in the unladen state, and the load-receiving device 627 is empty. In this case, the printed circuit board 613 of the encoder unit 612 bears, without bending, the force applied by the support element 434 to the encoder unit 612. In FIG. 8, the fourth drive 600 is shown in the laden state and the load-receiving device bears a payload 604. An external force action 404 is applied to the encoder unit 612 by means of the support element 434 by the weight 405 of the payload 604 in the vertical direction from above, that is to say in the transverse direction 609 transversely with respect to the path. As a result, the printed circuit board 613 is bent downward in the direction of the signal-detection unit 611 under the force action 404. In this respect, the printed circuit board 613 therefore forms an elastic part of the encoder unit 612.

The distance 608 between the signal-detection unit 611 and the encoder unit 612 is decreased by the bending of the printed circuit board 613 in the direction of the signal-detection unit 611. This can be detected by a signal-processing device (not illustrated) of the position-detection system 610 by means of a change in the square sum of the first and second position signals. As a result, the signal-processing system can detect the external force action 404 on the encoder unit 612, which force action 404 is applied by the weight 405 of the payload 604.

The encoder unit 612 can also be embodied in such a way that a change in the distance 608 is brought about by an external force action in a different way than by bending of the printed circuit board 613. For example, the encoder unit 612 can be mounted on the rotor 620 in such a way that an external force action on the encoder unit 612, for example by loading of the load-receiving device 627 with a payload 604, brings about an offset of the encoder unit 612 in the transverse direction and therefore transversely with respect to the path. Despite the offset, the encoder unit 612 can remain oriented essentially in parallel with the signal-detection device 611. For example, the encoder unit 612 can comprise a joint connection by means of which it is attached to the rotor 620 in such a way that the joint connection implements a parallelogram guiding means of the encoder unit 612. The encoder unit 612 can also comprise a guide receptacle which is mounted on the rotor 620 and which only permits movement of the encoder unit in the transverse direction 609 transversely with respect to the path. A resetting force, such as is required to return the encoder unit 612 to its original position after loading by the external force action, can be implemented, for example, by means of a spring which is arranged between the encoder unit 612 and the rotor 620.

A lateral offset of the encoder unit 612 without the angle between the encoder unit 612 and signal-detection unit 611 changing causes, in particular, the detection surfaces of the signal-detection unit 611 and the damping elements of the encoder unit 612 also to remain oriented in parallel with one another even when the distance 608 changes. As a result, as a result of the signal-processing device the distance 608 can be detected on the basis of the square sum of the first and second position signals by means of a simple formulaic relationship.

The mechanical coupling between the rotor 620 and the encoder unit 612 which is mounted on the rotor also permits disruption of the movement of the rotor 620 to be detected within the scope of the monitoring of the operating state of the fourth drive 600 by means of the determination of the distance 608. The disruption can be caused, for example, by damage or a defect of the guide system 605, for example on one or more of the rollers 623, on the roller bearings 624 or on the guide rail 606. For example, one of the rollers 623 or one of the running faces 602 may have a notch, an indent, a protrusion or some other damage. The disruption can also be caused by a covering, for example soiling, on the running faces 602 of the guide rail 606 or on the rollers 632. If the rotor 620 moves into a region of the guide rail 606 which has the damage, or if the roller 623 rotates into a position in which a damaged part of the roller 623 bears against the running faces 602, this causes the rotor 620 to tilt or to be offset in the transverse direction, and the distance 608 changes.

Depending on which of the running faces 602 or which of the rollers 623 has the damage, the distance 608 increases or decreases. As a result, it is possible to infer which of the running faces 602 or of the rollers 623 have the damage on the basis of the type of variation of the distance. In the case of operating states in which, in particular, a plurality of instances of damage or defects are present simultaneously, these defects or instances or damage can be differentiated by means of the size or amplitude and the sign of the change in the distance 608.

Within the scope of the determination of the operating state of the fourth drive 600 it is possible for the signal-processing device to determine not only the amplitude but also a frequency with which the distance 608 between the encoder unit 612 and the signal-detection unit 611 changes. This permits operating states in which the damage or disruption on the guide rail 606 occurs to be differentiated from operating states in which the damage or disruption on the roller arrangement 622 occurs. For this purpose, the change in the distance 608 can be correlated with other state variables of the fourth drive 600. The state variables may be, for example, the longitudinal position of the rotor 620 along the path, a speed of the rotor 620 along the path or the power absorption of the drive coils which drive the rotor 620.

For example, a rotational frequency of the rollers can be determined on the basis of the speed with which the rotor 620 moves along the path, and a known circumference of the rollers 623. If the frequency of the change in distance corresponds, for example, to this rotational frequency, damage or disruption of the rollers 623 or of the roller bearings 624 can be inferred therefrom. If the disruption of the movement of the rotors 620, and consequently the change in the distance 608, always occurs at the same longitudinal position of the rotor 620 along the path, it can be inferred that the disruption is caused by damage to the guide rail 606.

If the change in the distance 608 correlates with a change in the power absorption of the drive coils, and if, for example, a brief relatively high power absorption occurs with the change in the distance 608, it can be inferred therefrom that the rotor 620 has to overcome a relatively large running resistance. For example, the power absorption which is increased briefly can occur when the rotor 620 moves onto a covering or onto soiling of the guide rail 606. Such increased power absorption can occur, for example, even in the case of coverings with a thickness of less than 100 μm, in particular less than 50 μm.

In the case of a correlation of the distance 608 with a longitudinal position of the rotor 620 along the path and even in the case of a correlation of the distance 608 with the speed of the rotor 620 which is detected from the change in position, all the correlated state variables are acquired from the first and second position signals. In this respect, the information about the distance 608 and the information about the longitudinal position or the speed is available synchronously. Therefore, a correlation process does not require any further timing detection, for example by means of time stamps in the data items which are used, nor is there any need for further adjustment of the timing of the signals which are used to determine the operating state.

Detecting the disruption of the movement of the rotor 620 within the scope of the monitoring of the operating state of the fourth drive 600 permits the wear of the fourth drive 600 or of the guide system 605 to be monitored during operation. In particular, movement disruptions and therefore excessive wear can be detected and evaluated without delay and even during operation. Since the distance 608 between the encoder unit 612 and the signal-detection unit 611 is used for monitoring the operating state of the fourth drive 600, additional sensors on the fourth drive 600 for monitoring the operating state can be dispensed with.

The described detection of the disruption of the movement of the rotor 620 can also occur in an analogous fashion in the case of the first drive 1, the second drive 400 or the third drive 500. In particular, the detection of movement disruptions can be combined with the detection of an external force action on the respective encoder units 110, 412, 512.

In a further embodiment, a rotor of a drive can be designed to permit movement of the payload transversely with respect to the path. For example, for this purpose a load-receiving device can be arranged on the rotor so as to be shiftable in the transverse direction. The movement of the payload can be detected transversely with respect to the path by means of the distance between an encoder unit and a signal-detection unit which interacts therewith. For this purpose, the encoder unit of the rotor can be designed to follow the shifting of the load-receiving device in the transverse direction. In this respect, in such a case operating states of the drive can also be detected and operating states which are defined by a different position of the payload or of the load-receiving device in the transverse direction can be differentiated.

In other embodiments of the invention, a load-receiving device does not have to be arranged in the vertical direction above the rotor as illustrated in FIGS. 4, 5, 6 and 7. The load-receiving device can also be arranged laterally with respect to the rotor body or in the vertical direction underneath the rotor body. In this case, a suitable mechanical unit or lever device can ensure that a force action is applied to the encoder unit by the weight of the payload. If the payload is mounted underneath the rotor body, the encoder unit can, for example, be pulled or bent away downward from the signal-detection unit.

The described detection of an operating state of the first, second, third or fourth drive 1, 400, 500, 600 can also be implemented in an analogous fashion if an embodiment of the position-detection system is used in which an encoder unit is arranged along the path and a signal-detection unit is arranged on a rotor which can move along the path. A change in the distance between the encoder unit and signal-detection unit can then also be used to determine an external force action on the signal-detection unit which is arranged on the rotor. The change in the distance can be caused, for example, by bending of an elastic part of the signal-detection unit or by an offset, directed transversely with respect to the path, of the signal-detection unit with respect to the encoder unit.

A position-detection system according to the invention for a drive having a rotor which can move along a path is designed to determine both a longitudinal position of the rotor along the path and a distance between an encoder unit and a signal-detection unit of the position-detection system on the basis of a first and a second position signal. Since the longitudinal position is detected on the basis of phase values of the position signals, and the distance is detected on the basis of amplitude values of the position signals, the longitudinal position and the distance can advantageously be detected independently of one another. In particular, a change in the distance does not influence the determined longitudinal position of the rotor, or only to a slight extent. Conversely, the longitudinal position of the rotor likewise does not influence the determined distance, or only just so to a slight extent.

On the basis of the distance it is easily possible to detect an operating state of the drive, and the operating state can be monitored during operation of the drive. Within the scope of the detection of the operating state, for example the influence of a payload, conveyed by the rotor, on the rotor, can be determined, or disruption of the movement of the rotor can be detected, by means of the distance between the encoder unit and the signal-detection unit.

The influence of the payload on the rotor or on an encoder unit or signal-detection unit which is mounted on the rotor permits, for example, easy detection of the presence of the payload on the rotor. The weight of the payload can furthermore be determined by means of the distance. As a result, within the scope of the determination of the operating state it is possible, for example, to differentiate payloads of different weights from one another. By determining the distance it is also possible, for example, to detect when a permissible maximum weight or a weight limit is exceeded by the payload. Since, under certain circumstances, the weight is transmitted to the encoder unit or the signal-detection unit of the position-detection system by means of a mechanical unit, an external force action which is applied to the position-detection system by the weight of the payload can be adapted. As a result, it is possible, for example, to increase a measuring range which is available for the determination of the weight. Likewise, the measuring range can be shifted by means of the mechanical unit, for example by means of a mechanical unit which comprises a counterweight and a stop.

Detection or disruption of the movement of the rotor by means of determination of the distance makes it possible easily to monitor wear of a guide system of the drive which guides the rotor along the path. In particular, defects in rollers and guide rails of the guide system can be detected. A correlation of the distance with further state variables of the drive, for example with a longitudinal position of the rotor, a speed of the rotor or a power absorption by drive elements which drive the rotor, easily permits defects of the rollers or of other elements of the guide system which are arranged on the rotor to be differentiated from defects in elements of the guide system which are arranged in a positionally fixed fashion along the path.

Both the external force action by a payload and the disruption of movement of the rotor can advantageously be detected while the rotor is moving. This permits high-speed and efficient operation of a drive with a position-detection system according to the invention, and permits early detection of faulty or safety-critical operating states.

Since the operating state is detected on the basis of position signals of the position-detection system, the operating state can be detected without additional sensors mounted along the path or on the rotor. This determination of the operating state which is integrated into the position-detection system reduces, in particular, the number of components necessary for the drive and therefore simplifies the design of the drive in terms of hardware.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A position-detection system for monitoring an operating state of a drive having a rotor which can move along a path, comprising an encoder unit, a signal-detection unit and a signal-processing device, wherein the encoder unit or the signal-detection unit is arranged on the rotor, and the respective other unit is arranged along the path, wherein the signal-processing device is designed to generate a first position signal and a second position signal on the basis of a relative position of the encoder unit and the signal-detection unit, wherein the signal-processing device is designed to determine a longitudinal position of the rotor along the path on the basis of phase values of the first and second position signals, and wherein the signal-processing device is designed to determine a distance, directed transversely with respect to the path, between the encoder unit and the signal-detection unit on the basis of amplitude values of the first and second position signals, and to detect on the basis of the distance a disruption in a movement of the rotor and/or an external force action acting on the encoder unit or the signal-detection unit.

2. The position-detection system as claimed in claim 1,
wherein the position-detection system is embodied as an inductive position-detection system,
wherein the signal-detection unit comprises an exciter coil, a sine receiver coil and a cosine receiver coil,
wherein the sine receiver coil and the cosine receiver coil form a sinusoidal surface border and are arranged with a spatial phase offset,
wherein the signal-processing device is designed to generate the first position signal on the basis of signals of the sine receiver coil and to generate the second position signal on the basis of signals of the cosine receiver coil, and
wherein the signal-processing device is designed to determine the longitudinal position on the basis of a ratio between the first position signal and the second position signal and to determine the distance on the basis of a square sum of the first and second position signals.

3. The position-detection system as claimed in claim 1,
wherein the signal-processing device is designed to determine a frequency and/or an amplitude of a variation of the distance in order to detect the disruption in the movement of the rotor and/or the external force action acting on the encoder unit or the signal-detection unit.

4. The position-detection system as claimed in claim 1,
wherein the signal-processing device is designed to detect a defect in a guide system, guiding the rotor along the path, of the drive.

5. The position-detection system as claimed in claim 1,
wherein, for the purpose of detecting the disruption in the movement of the rotor and/or the external force action acting on the encoder unit or the signal-detection unit, the signal-processing device is designed to correlate the distance with the longitudinal position of the rotor along the path and/or with a speed of the rotor and/or with energy absorption of a drive element, which drives the rotor, of the drive.

6. The position-detection system as claimed in claim 1,
wherein the signal-detection unit is arranged in a positionally fixed fashion along the path, and
wherein the encoder unit is arranged on the rotor.

7. The position-detection system as claimed in claim 1,
wherein the encoder unit and the signal-detection unit are arranged in such a way that a weight of a payload which is conveyed by the rotor causes the external force action.

8. The position-detection system as claimed in claim 7,
wherein the encoder unit and the signal-detection unit are arranged in such a way that the external force action is applied by a mechanical unit to the encoder unit or the signal-detection unit, and
wherein the mechanical unit is designed to generate a transverse force, directed transversely with respect to the path, on the basis of the weight of the payload.

9. The position-detection system as claimed in claim 7,
wherein the encoder unit or the signal-detection unit is mounted on the rotor and is designed in such a way that the external force action essentially brings about elastic bending of an elastic part of the encoder unit or of the signal-detection unit transversely with respect to the path.

10. The position-detection system as claimed in claim 7,
wherein the encoder unit or the signal-detection unit is arranged on the rotor and is designed in such a way that the external force action brings about essentially an offset, directed transversely with respect to the path, of the encoder unit or of the signal-detection unit in relation to the respective other unit.

11. A drive having a position-detection system as claimed in claim 1,
a rotor which can move along a path and a guide system which guides the rotor along the path,
wherein the drive is embodied as a linear motor, and comprises a drive device which is arranged along the path,
wherein the drive device comprises a multiplicity of drive coils which are arranged along the path,
wherein the rotor has a drive magnet, and
wherein the drive coils are designed to generate a magnetic field which interacts with the drive magnet of the rotor in order to generate a driving force.

12. A position-detection system for monitoring an operating state of a drive having a rotor which can move along a path, comprising
an encoder unit, a signal-detection unit and a signal-processing device,
wherein the encoder unit or the signal-detection unit is arranged on the rotor, and the respective other unit is arranged along the path,
wherein the signal-processing device is designed to generate a first position signal and a second position signal on the basis of a relative position of the encoder unit and the signal-detection unit,
wherein the signal-processing device is designed to determine a distance, directed transversely with respect to the path, between the encoder unit and the signal-detection unit on the basis of amplitude values of the first and second position signals, and
wherein the signal-processing device is designed to detect an operating state of the drive on the basis of the distance.

13. The position-detection system as claimed in claim 12,
wherein the detection of the operating state of the drive by the signal-processing device comprises the signal-processing device determining a frequency and/or an amplitude of a variation of the distance.

14. The position-detection system as claimed in one of claim 12,
wherein the detection of the operating state of the drive by the signal-processing device comprises the signal-processing device detecting an external force action on the encoder unit or the signal-detection unit.

* * * * *